United States Patent
Kim et al.

(10) Patent No.: US 10,986,443 B2
(45) Date of Patent: Apr. 20, 2021

(54) DISPLAY APPARATUS

(71) Applicant: SAMSUNG ELECTRONICS CO., LTD., Suwon-si (KR)

(72) Inventors: Sungjoo Kim, Suwon-si (KR); Hanjin Park, Suwon-si (KR); Jongbae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/905,370

(22) Filed: Jun. 18, 2020

(65) Prior Publication Data

US 2020/0404413 A1 Dec. 24, 2020

(30) Foreign Application Priority Data

Jun. 24, 2019 (KR) .......................... 10-2019-0075084

(51) Int. Cl.
*H04R 1/34* (2006.01)
*G02F 1/1333* (2006.01)

(52) U.S. Cl.
CPC ....... *H04R 1/345* (2013.01); *G02F 1/133308* (2013.01); *H04R 2499/15* (2013.01)

(58) Field of Classification Search
CPC ...... H04N 5/642; H04R 17/005; H04R 1/025; H04R 1/2873; H04R 1/345; H04R 2499/15; G02F 1/133308
USPC ...................................................... 349/58–60
See application file for complete search history.

(56) References Cited

U.S. PATENT DOCUMENTS

| | | |
|---|---|---|
| 8,180,074 B2 | 5/2012 | Ko et al. |
| 2007/0071259 A1 | 3/2007 | Tojo |
| 2013/0156233 A1 | 6/2013 | Joo |
| 2014/0247959 A1 | 9/2014 | Yamanaka et al. |
| 2017/0245032 A1 | 8/2017 | Yoon et al. |

(Continued)

FOREIGN PATENT DOCUMENTS

| | | |
|---|---|---|
| JP | 4437106 B2 | 3/2010 |
| JP | 2015-186197 A | 10/2015 |

(Continued)

OTHER PUBLICATIONS

International Search Report (PCT/ISA/210) dated Sep. 28, 2020 by the International Searching Authority in counterpart International Patent Application No. PCT/KR2020/007463.

(Continued)

*Primary Examiner* — Charles S Chang
(74) *Attorney, Agent, or Firm* — Sughrue Mion, PLLC

(57) ABSTRACT

A display apparatus includes a rear chassis configured to support a liquid crystal display panel and a backlight assembly; a vibration region formed as a part of the rear chassis adjacent to an edge of the rear chassis, the vibration region being isolated from a remaining part of the rear chassis by a vibration blocking part so that vibration is not transmitted to the remaining part of the rear chassis; a vibrator disposed in the vibration region; a rear housing configured to surround the rear chassis and including a discharge port communicating with the vibration region of the rear chassis to discharge sound generated in the vibration region to an outside; and a waveguide disposed on the rear chassis and configured to guide sound generated in the vibration region to the discharge port of the rear housing.

18 Claims, 36 Drawing Sheets

(56) References Cited

U.S. PATENT DOCUMENTS

| | | |
|---|---|---|
| 2018/0091635 A1 | 3/2018 | Lee et al. |
| 2019/0037164 A1* | 1/2019 | Kim ..................... H04R 1/2873 |
| 2020/0097244 A1* | 3/2020 | Kim ........................ H04R 1/28 |

FOREIGN PATENT DOCUMENTS

| | | |
|---|---|---|
| KR | 10-0691995 B1 | 3/2007 |
| KR | 10-1340704 B1 | 12/2013 |
| KR | 10-2017-0069530 A | 6/2017 |
| KR | 10-2017-0098009 A | 8/2017 |
| KR | 10-1919454 B1 | 11/2018 |

OTHER PUBLICATIONS

Written Opinion (PCT/ISA/237) dated Sep. 28, 2020 by the International Searching Authority in counterpart International Patent Application No. PCT/KR2020/007463.

\* cited by examiner

DISPLAY APPARATUS

CROSS-REFERENCE TO RELATED APPLICATION(S)

This application is based on and claims priority under 35 U.S.C. § 119 to Korean Patent Application No. 10-2019-0075084, filed on Jun. 24, 2019, in the Korean Intellectual Property Office, the disclosure of which is incorporated by reference herein in its entirety.

BACKGROUND

1. Field

The disclosure relates to a display apparatus, and more particularly, to a display apparatus having a speaker.

2. Description of Related Art

With the development of electronic technology, a display apparatus tends to gradually increase in area of a screen displaying an image and become thinner in thickness thereof.

Generally, display apparatuses, particularly display apparatuses such as TVs, are equipped with speakers for reproducing sound.

However, installing a separately formed speaker in the display apparatus limits the reduction in thickness of the display apparatus. In addition, there is a problem that it is not easy to make the speaker installed in the display apparatus thin in order to reduce the thickness of the display apparatus.

SUMMARY

Provided is a display apparatus having a speaker implemented using a vibrator and having a structure so as to reduce the thickness of the display apparatus.

According to an aspect of the disclosure, a display apparatus may include a rear chassis configured to support a liquid crystal display panel and a backlight assembly; a vibration region formed as a part of the rear chassis adjacent to an edge of the rear chassis, the vibration region isolated from a remaining part of the rear chassis by a vibration blocking part so that vibration is not transmitted to the remaining part of the rear chassis; a vibrator disposed in the vibration region; a rear housing configured to surround the rear chassis and including a discharge port communicating with the vibration region of the rear chassis to discharge sound generated in the vibration region to an outside; and a waveguide disposed on the rear chassis and configured to guide sound generated in the vibration region to the discharge port of the rear housing.

The vibration blocking part may include a slit surrounding the vibration region and isolating the vibration region from the remaining part of the rear chassis and a plurality of bridges provided in the slit and connecting the vibration region to the remaining part of the rear chassis.

According to an aspect of the disclosure, a display apparatus may include a rear chassis configured to support a liquid crystal display panel and a backlight assembly; a vibration plate provided to face a part of the rear chassis adjacent to an edge of the rear chassis and spaced apart from the part by a predetermined distance; a vibrator disposed in the vibration plate; a rear housing configured to surround the rear chassis and including a discharge port communicating with a space in contact with the vibration plate of the rear chassis to discharge sound generated by the vibration plate to an outside; and a waveguide disposed between the backlight assembly and the rear housing and configured to guide sound generated by the vibration plate to the discharge port of the rear housing.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments of a display apparatus according to the disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Figure 1:
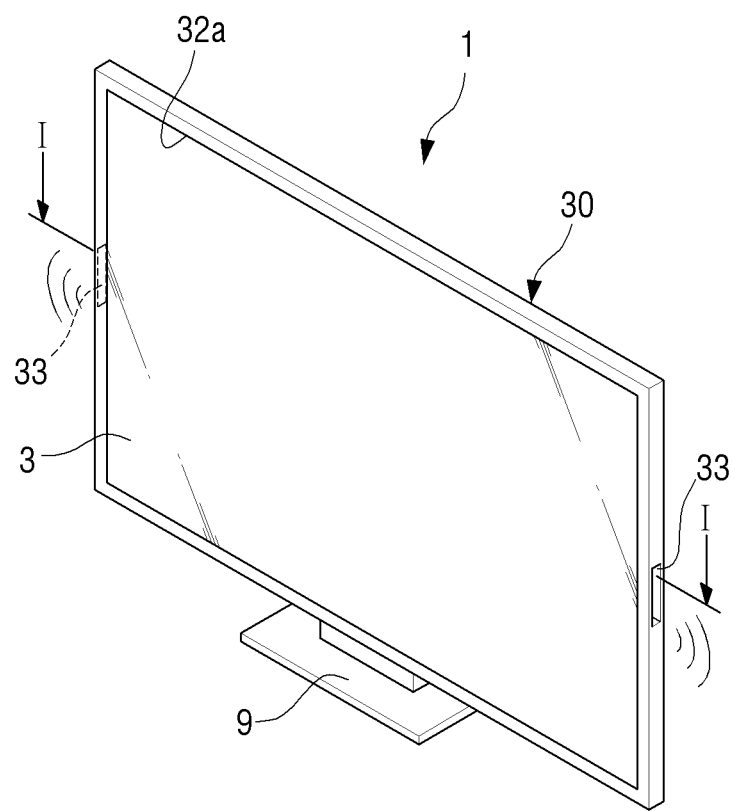
FIG. 1 is a perspective view illustrating a display apparatus according to an embodiment.
Figure 2:
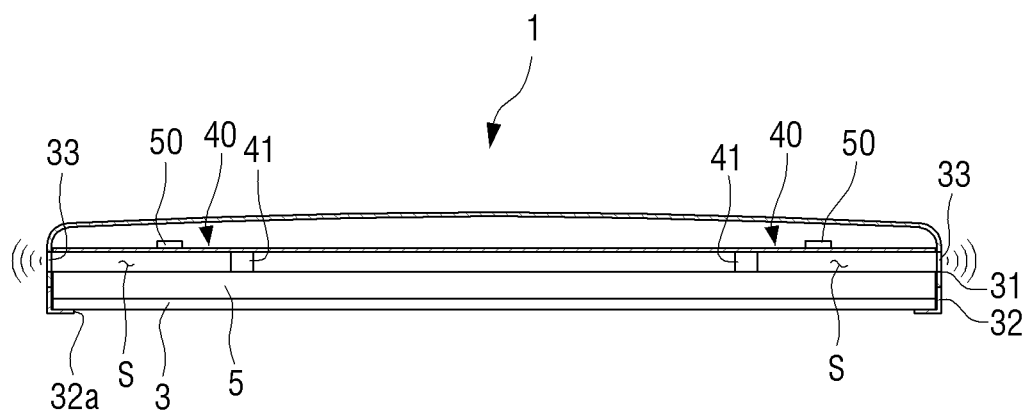
FIG. 2 is a cross-sectional view illustrating the display apparatus of FIG. 1 taken along line I-I.
Figure 3:
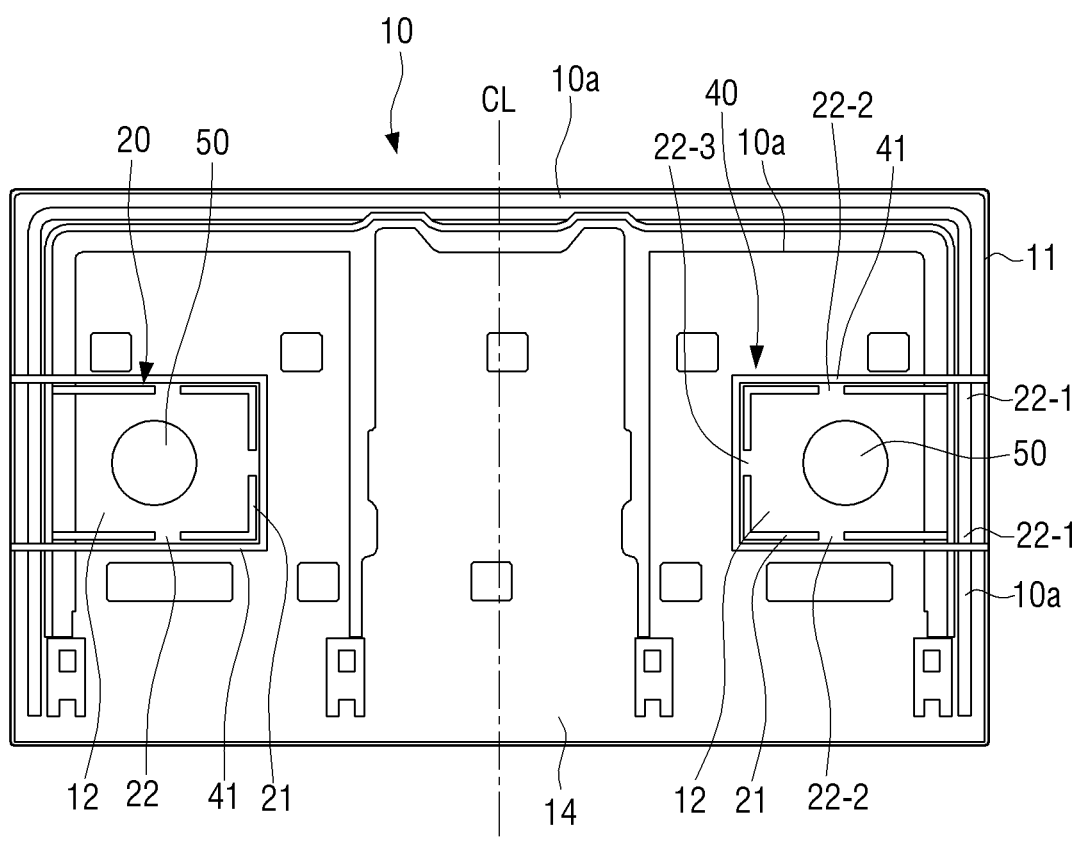
FIG. 3 is a plan view illustrating a rear chassis of the display apparatus of FIG. 1.
Figure 4:
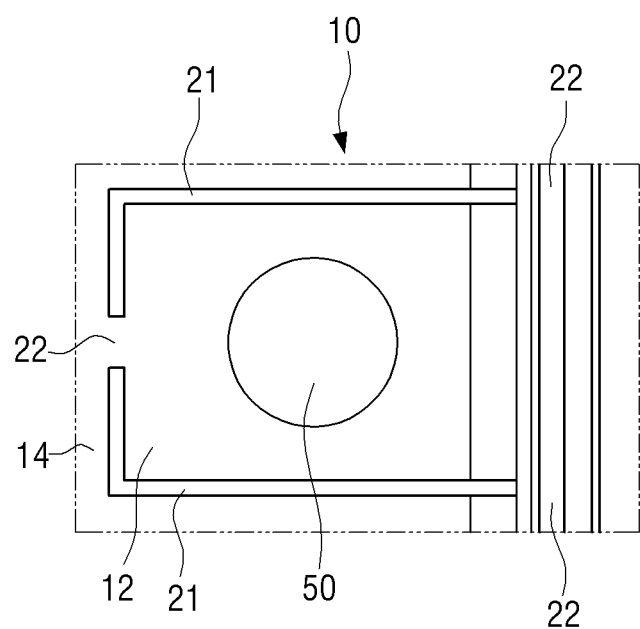
FIG. 4 is a partial view illustrating another example of a vibration blocking part that partitions a vibration region provided in a rear chassis of a display apparatus according to an embodiment.

FIG. 1 is a perspective view illustrating a display apparatus according to an embodiment. FIG. 2 is a cross-sectional view illustrating the display apparatus of FIG. 1 taken along line I-I, and FIG. 3 is a plan view illustrating a rear chassis of the display apparatus of FIG. 1. FIG. 4 is a partial view illustrating another example of a vibration blocking part that partitions a vibration region provided in a rear chassis of a display apparatus according to an embodiment.

Referring to FIGS. 1 and 2, a display apparatus 1 according to an embodiment may include a liquid crystal display panel 3, a backlight assembly 5, a rear chassis 10, and a housing 30.

The liquid crystal display panel 3 is configured to display an image.

The backlight assembly 5 is disposed behind the liquid crystal display panel 3 and configured to supply light to the liquid crystal display panel 3 so that the liquid crystal display panel 3 may display an image. The backlight assembly 5 may include a light guide plate and a light source.

The liquid crystal display panel 3 and the backlight assembly 5 are the same as or similar to the liquid crystal display panel and the backlight assembly of the display apparatus according to the related art, and thus detailed descriptions thereof are omitted.

The rear chassis 10 is provided to support the liquid crystal display panel 3 and the backlight assembly 5. Therefore, the backlight assembly 5 is disposed behind the backlight assembly 5. The rear chassis 10 may be formed to cover the entire rear surface of the backlight assembly 5.

A front chassis may be disposed in front of the rear chassis 10 so that the liquid crystal display panel 3 and the backlight assembly 5 are fixed to the rear chassis 10. An opening may be provided in the front surface of the front chassis to expose the liquid crystal display panel 3.

In addition, as illustrated in FIG. 3, the rear chassis 10 may be provided with a plurality of reinforcing beads 10a to reinforce the strength of the rear chassis 10. The reinforcing beads 10a may be formed in various shapes. For example, the reinforcing beads 10a may be formed as a long groove, a substantially rectangular step portion, and the like.

The rear chassis 10 is provided with a vibration region 12 in which a vibrator 50 is disposed. The vibration region 12 may be formed of a part of the rear chassis 10. The vibration region 12 of the rear chassis 10 is vibrated by the vibrator 50 to generate sound.

One or two or more vibration regions 12 may be provided in the rear chassis 10. Two vibration regions 12 may be provided in the rear chassis 10 to realize stereo. FIG. 3 shows the rear chassis 10 provided with two vibration regions 12.

Referring to FIG. 3, the two vibration regions 12 are formed in the rear chassis 10 so as to be line-symmetrical with respect to the longitudinal center line CL of the rear chassis 10. The vibrator 50 is disposed in each of the two vibration regions 12.

The two vibration regions 12 are formed in the same way; therefore, the following description will be made based on one vibration region 12.

The vibration region 12 is formed of a part of the rear chassis 10 contacting the edge 11 of the rear chassis 10 as illustrated in FIG. 3. In other words, the vibration region 12 is formed as a part of the rear chassis 10.

The vibration region 12 is isolated from the remaining part 14 of the rear chassis 10 by a vibration blocking part 20 so that vibration is not transmitted to the remaining part 14. In other words, only a partial region of the rear chassis 10 partitioned by the vibration blocking part 20 becomes the vibration region 12 vibrated by the vibrator 50. Therefore, even when the vibration region 12 is vibrated by the vibrator 50, the vibration of the vibration region 12 is blocked by the vibration blocking part 20 and is not transmitted to the remaining part 14 of the rear chassis 10. Here, the remaining part 14 of the rear chassis 10 refers to the entire part of the rear chassis 10 except for the vibration region 12.

The vibration blocking part 20 is formed to block vibration so that vibration generated in the vibration region 12 is not transmitted to the remaining part 14 of the rear chassis 10.

For example, the vibration blocking part 20 may be formed in a slit 21 penetrating the rear chassis 10 as illustrated in FIG. 3. In detail, the vibration blocking part 20 may include the slit 21 for cutting the vibration region 12 from the remaining part 14 of the rear chassis 10 and a plurality of bridges 22 for connecting the vibration region 12 and the remaining part 14 of the rear chassis 10.

The slit 21 is formed to surround the vibration region 12 and isolate the vibration region 12 from the remaining part 14 of the rear chassis 10. Accordingly, the vibration region 12 and the remaining part 14 of the rear chassis 10 are spaced apart from each other by the slit 21.

The plurality of bridges 22 are provided in the slit 21, and configured to connect the vibration region 12 and the remaining part 14 of the rear chassis 10 so that the vibration region 12 is not separated from the rear chassis 10. The area of the plurality of bridges 22 is formed to be very small compared to the area of the slit 21 so that the vibration of the vibration region 12 is not transmitted to the remaining part 14.

As an example, the vibration blocking part 20 as illustrated in FIG. 3 includes the slit 21 formed to surround the vibration region 12 having a substantially rectangular shape and five bridges 22. The five bridges 22 may include two bridges 22-1 connecting the edge 11 of the rear chassis 10 and the edge of the vibration region 12, two bridges 22-2 provided at the centers of the top and bottom of the vibration region 12 to be connected to the remaining part 14 of the rear chassis 10, and a single bridge 22-3 provided at the inner end of the vibration region 12 to be connected to the remaining part 14 of the rear chassis 10.

However, the number of the plurality of bridges 22 is not limited thereto. The plurality of bridges 22 may be formed in various numbers at various positions so long as the vibration region 12 can vibrate without being separated from the rear chassis 10.

For example, as illustrated in FIG. 4, three bridges 22 may be formed in the vibration region 12 to be connected to the remaining part 14 of the rear chassis 10.

In the above description, the vibration blocking part 20 is formed in the slit 21. However, the vibration blocking part 20 is not limited thereto. As another example, the vibration blocking part 20 may be formed as a long groove.

Figure 5:
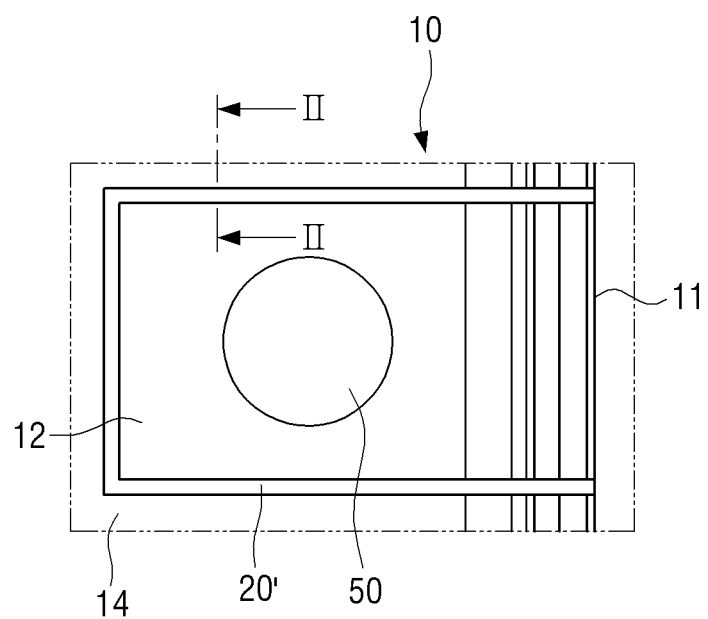
FIG. 5 is a partial view illustrating another example of a vibration blocking part that partitions a vibration region provided in a rear chassis of a display apparatus according to an embodiment.
Figure 6A:
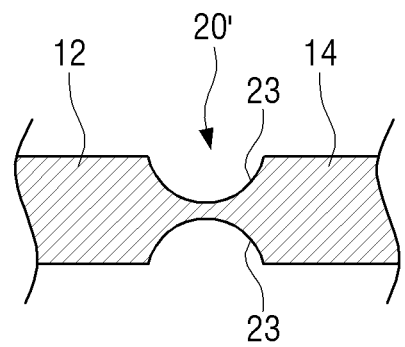
FIG. 6A is a cross-sectional view illustrating the vibration blocking part of FIG. 5 taken along line II-II.
Figure 6B:
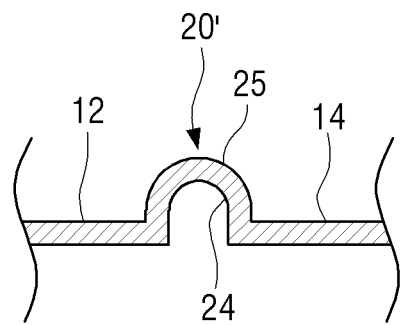
FIG. 6B is a cross-sectional view illustrating another example of a vibration blocking part.

FIG. 5 is a partial view illustrating another example of a vibration blocking part that partitions a vibration region provided in a rear chassis of a display apparatus according to an embodiment. FIG. 6A is a cross-sectional view illustrating the vibration blocking part of FIG. 5 taken along line II-II. FIG. 6B is a cross-sectional view illustrating another example of a vibration blocking part.

Referring to FIG. 5, the vibration blocking part 20' may be formed as a long groove 23 formed in the rear chassis 10 to surround the vibration region 12. The long groove 23 is formed in a substantially flattened U-shape so as to surround the rectangular-shaped vibration region 12. The long groove 23 may be formed in a shape in which an upper groove formed on the upper surface of the rear chassis 10 and a lower groove formed on the lower surface of the rear chassis 10 face each other as illustrated in FIG. 6A. When the long groove 23 is formed in this way, there is no protrusion protruding toward the outside of the rear chassis 10.

As another example, the vibration blocking part 20' may be formed as a long groove 24 having a protrusion 25 protruding from one surface of the rear chassis 10 as illustrated in FIG. 6B. In this case, the protrusion 25 formed in the rear chassis 10 may face the backlight assembly 5. Alternatively, the protrusion 25 may be formed to face the rear housing 31.

Figure 7A:
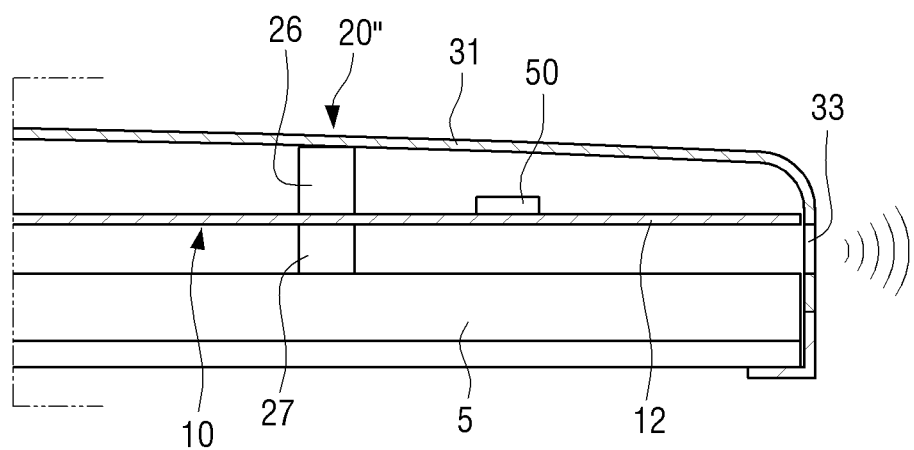
FIG. 7A is a partial cross-sectional view illustrating a display apparatus having a vibration blocking part according to another example.
Figure 7B:
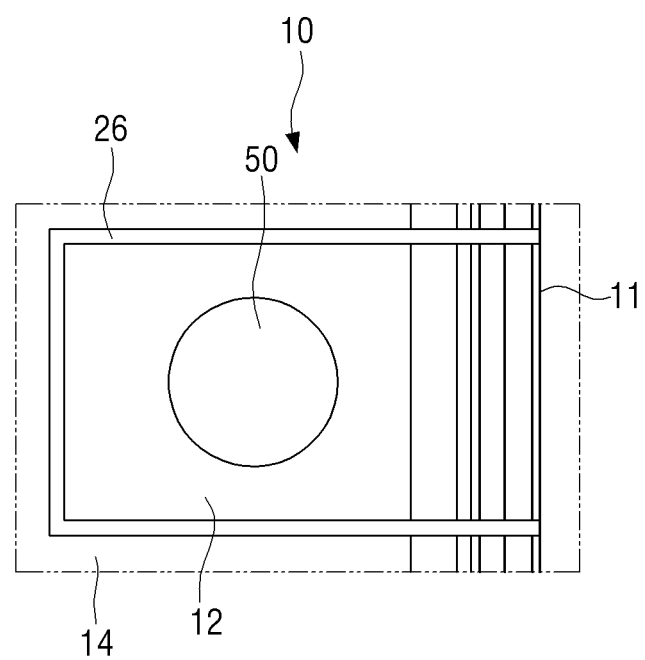
FIG. 7B is a partial rear view illustrating a state in which a rear housing is removed in FIG. 7A.

As another example, the vibration blocking part 20'' may be formed of damping members as illustrated in FIGS. 7A and 7B.

FIG. 7A is a partial cross-sectional view illustrating a display apparatus having a vibration blocking part according to another example, and FIG. 7B is a partial rear view illustrating a state in which a rear housing is removed in FIG. 7A.

Referring to FIGS. 7A and 7B, an upper damping member 26 and a lower damping member 27 forming the vibration blocking part 20'' are disposed along the periphery of the vibration region 12 on the upper and lower surfaces of the rear chassis 10. The upper damping member 26 is provided along the periphery of the vibration region 12 on the upper surface of the rear chassis 10 and the lower damping member 27 is provided along the periphery of the vibration region 12 on the lower surface of the rear chassis 10.

The upper damping member 26 and the lower damping member 27 are disposed to face each other with rear chassis 10 interposed therebetween. The upper and lower damping members 26 and 27 absorb vibration generated in the vibration region 12, thereby blocking the vibration from being transmitted to the outside of the upper and lower damping members 26 and 27, that is, to the remaining part 14 of the rear chassis 10. At this time, the upper damping member 26 or the lower damping member 27 may perform the function of a waveguide 40 to be described later.

The vibrator 50 is disposed in the vibration region 12 and vibrates the vibration region 12 according to a signal input from the outside to generate sound. The vibrator 50 having a low height may be used.

For example, the vibrator 50 may have a lower height than that of the reinforcing beads 10a of the rear chassis 10. At this time, the vibrator 50 may be disposed on one surface of the rear chassis 10 from which the reinforcing bead 10a protrudes. For example, when the reinforcing bead 10a is formed to protrude from the upper surface of the rear chassis 10, the vibrator 50 may be disposed on the upper surface of the rear chassis 10, that is, the upper surface of the vibration region 12.

In addition, the vibrator 50 may be disposed to avoid the low frequency nodal line of the vibration region 12. The vibrator 50 is disposed in the vibration region 12 and vibrates together with the vibration region 12 when the vibration region 12 vibrates. The structure of the vibrator 50 is the same as or similar to the related art vibrator; therefore, detailed description thereof is omitted.

The housing 30 is provided to support the liquid crystal display panel 3, the backlight assembly 5, and the rear chassis 10. The housing 30 is supported by a stand 9 as illustrated in FIG. 1. Although not illustrated, when the display apparatus 1 is disposed in the form of a wall mount, a wall mount fixing device is provided on the rear surface of the housing 30.

The housing 30 may include a front housing 32 covering the front surface of the liquid crystal display panel 3 and a rear housing 31 covering the rear surface of the rear chassis 10.

An opening 32a is provided in the front housing 32 so that the liquid crystal display panel 3 may be exposed. The front housing 32 is coupled to the rear housing 31 to form the housing 30.

The rear housing 31 is formed to support and surround the rear chassis 10. The rear housing 31 includes a discharge port 33 that communicates with a space S in contact with the vibration region 12 of the rear chassis 10 and discharges sound generated in the vibration region 12 to the outside. In other words, the discharge port 33 of the rear housing 31 is formed to correspond to the vibration region 12 formed in the rear chassis 10.

The display apparatus 1 as illustrated in FIGS. 1 and 2 includes two vibration regions 12. Therefore, the rear housing 31 includes two discharge ports 33 corresponding to the two vibration regions 12. At this time, because the two vibration regions 12 are formed to face both sides of the rear chassis 10, the two discharge ports 33 are formed on both side surfaces of the rear housing 31 as illustrated in FIG. 1.

The waveguide 40 is disposed on one surface of the rear chassis 10 and is formed to guide sound generated in the vibration region 12 of the rear chassis 10 to the discharge port 33 of the rear housing 31. In other words, the waveguide 40 may guide the sound so that the sound generated in the vibration region 12 is not extinguished inside the display apparatus 1 but discharged to the outside of the display apparatus 1.

Referring to FIG. 2, the waveguide 40 of the display apparatus 1 according to an embodiment is provided between the rear chassis 10 and the backlight assembly 5. In detail, the waveguide 40 is formed by a sound absorbing member 41 provided along the periphery of the vibration region 12 on one surface of the rear chassis 10 facing the backlight assembly 5 and the rear surface of the backlight assembly 5.

The sound absorbing member 41 is disposed on the outside of the vibration blocking part 20, and is formed in an approximately flattened U-shape to correspond to the entire length of the three sides of the vibration region 12. The opening of the waveguide 40 without the sound absorbing member 41 is in communication with the discharge port 33 of the rear housing 31. The sound absorbing member 41 prevents sound generated in the vibration region 12 from spreading into the space between the rear chassis 10 and the backlight assembly 5. Accordingly, the sound generated in the vibration region 12 is discharged to the outside of the display apparatus 1 through the waveguide 40 and the discharge port 33 of the rear housing 31.

Referring to FIG. 2, the vibrator 50 is provided on the upper surface of the rear chassis 10, that is, on the upper surface of the vibration region 12. Therefore, when the vibrator 50 is operated, the vibration region 12 vibrates to generate sound. At this time, the sound is generated at the upper and lower sides of the vibration region 12.

The sound generated at the lower side of the vibration region 12, that is, between the vibration region 12 and the backlight assembly 5 is discharged to the outside of the display apparatus 1 through the waveguide 40 and the discharge port 33 of the rear housing 31. In other words, the vibrator 50 and the vibration region 12 of the rear chassis 10 acts as a speaker to generate sound, and the sound is discharged to the outside through the waveguide 40 and the discharge port 33. Therefore, the user may hear sound from the display apparatus 1.

However, the sound generated in the upper side of the vibration region 12 is not emitted to the outside of the display apparatus 1 but is extinguished through the space between the rear chassis 10 and the rear housing 31.

In the above description, the vibration region 12 is formed in the same plane as the rear chassis 10. However, the vibration region 12 may be formed in a step portion 13 provided in the rear chassis 10.

Figure 8A:
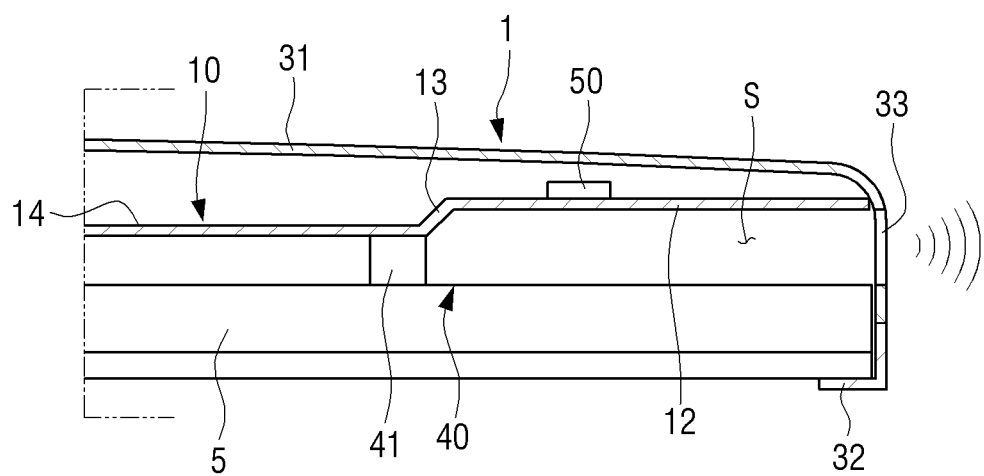
FIG. 8A is a partial cross-sectional view illustrating a display apparatus according to an embodiment.
Figure 8B:
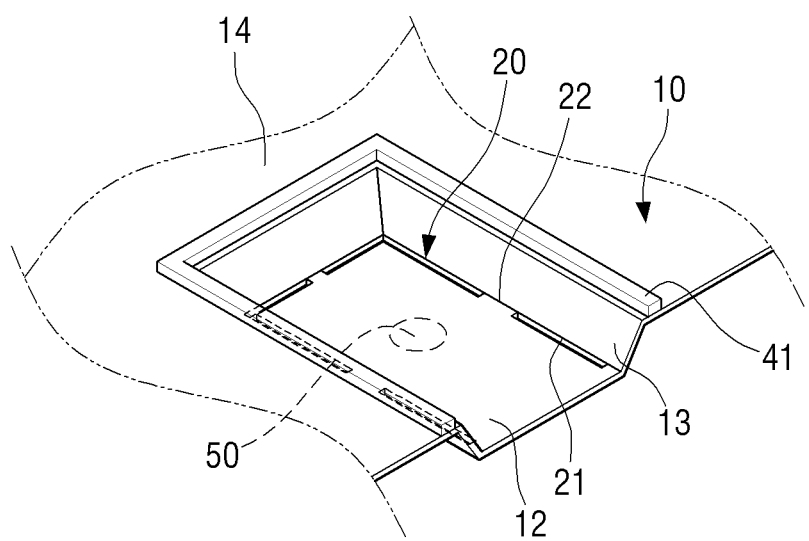
FIG. 8B is a partial perspective view illustrating a vibration region provided in a step portion of a rear chassis of FIG. 8A.
Figure 8C:
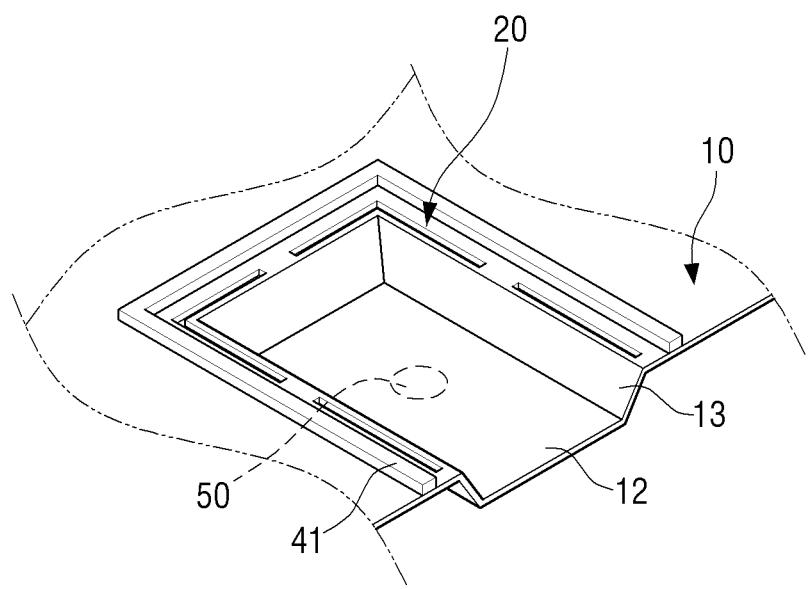
FIG. 8C is a partial perspective view illustrating another example of a vibration region provided in a step portion of a rear chassis.

FIG. 8A is a partial cross-sectional view illustrating a display apparatus according to an embodiment. FIG. 8B is a partial perspective view illustrating a vibration region provided in a step portion of a rear chassis of FIG. 8A. FIG. 8C is a partial perspective view illustrating another example of a vibration region provided in a step portion of a rear chassis.

Referring to FIGS. 8A and 8B, a step portion 13 protruding toward the rear housing 31 is formed in the rear chassis 10. In other words, the step portion 13 is formed to protrude above the remaining part 14 of the rear chassis 10. The step portion 13 is formed in a substantially flattened U-shape, and one side surface of the step portion 13 is open.

The opening formed on one side surface of the step portion 13 of the rear chassis 10 is in communication with the discharge port 33 of the rear housing 31. The vibration region 12 is formed on the bottom surface of the step portion 13. The vibration blocking part 20 may be provided around the vibration region 12. In other words, the vibration region 12 and the vibration blocking part 20 may be provided on the bottom surface of the step portion 13. In the case of this embodiment, the vibration blocking part 20 is formed of a slit 21 surrounding the vibration region 12 and a plurality of bridges 22. Therefore, the vibration generated in the vibration region 12 is blocked by the vibration blocking part 20 and is not transmitted to the remaining part 14 of the rear chassis 10.

The step portion 13 of the rear chassis 10 may function as a waveguide that guides the sound generated by the vibration region 12 to the discharge port 33 of the rear housing 31. Accordingly, the sound generated by the vibration region 12 of the step portion 13 is guided to the discharge port 33 of the rear housing 31 by the side surfaces of the step portion 13 and the rear surface of the backlight assembly 5.

As another example, in order to prevent sound from leaking through a gap between the rear surface of the backlight assembly 5 and the portion of the rear chassis 10 adjacent to the step portion 13, the sound absorbing member 41 may be disposed around the step portion 13 of the rear chassis 10 as illustrated in FIG. 8B. When the sound absorbing member 41 is provided around the step portion 13 as described above, all sound generated by the vibration region 12 is discharged to the outside through the discharge port 33 of the rear housing 31.

In the above description, the vibration blocking part 20 is formed on the bottom surface of the step portion 13. However, the installation position of the vibration blocking part 20 is not limited thereto. As another example, the vibration blocking part 20 may be provided to surround the step portion 13 in the rear chassis 10 as illustrated in FIG. 8C, not the bottom surface of the step portion 13. In this case, the sound absorbing member 41 may be provided to surround the vibration blocking part 20 outside the vibration blocking part 20. Alternatively, although not illustrated, the sound absorbing member 41 may be provided between the step portion 13 and the vibration blocking part 20 inside the vibration blocking part 20.

In FIG. 8A, the step portion 13 of the rear chassis 10 protrudes toward the rear housing 31. Alternatively, although not illustrated, the step portion 13 of the rear chassis 10 may be formed to protrude toward the backlight assembly 5. In this case, the sound generated by the vibration region 12 of the step portion 13 is guided by the side surfaces of the step portion 13 and the rear housing 31, and then is discharged to the outside through the discharge port 33 of the rear housing 31.

In the above description, the waveguide 40 is composed of the sound absorbing member 41 disposed around the vibration region 12 and the rear surface of the backlight assembly 5. However, the structure of the waveguide 40 is not limited thereto. The waveguide may be formed of a guide duct 60 formed separately from the rear chassis 10.

Figure 9A:
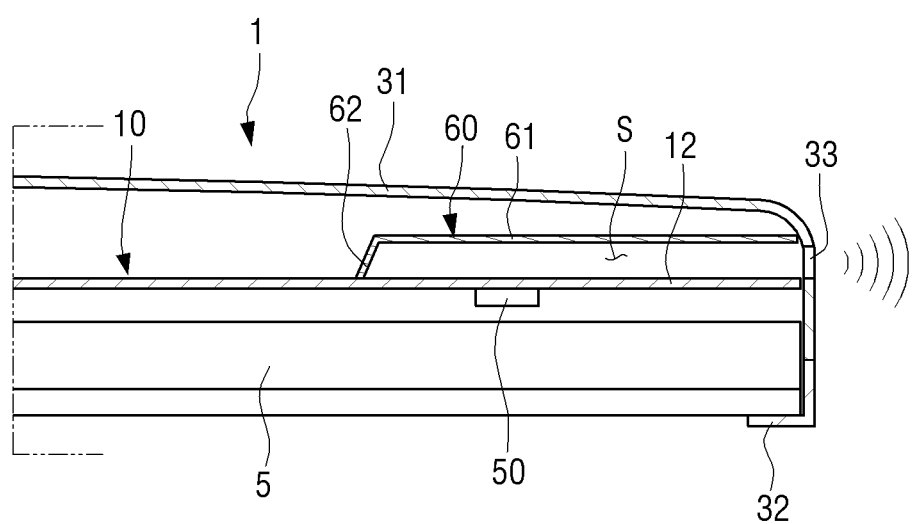
FIG. 9A is a partial cross-sectional view illustrating a display apparatus according to an embodiment.
Figure 9B:
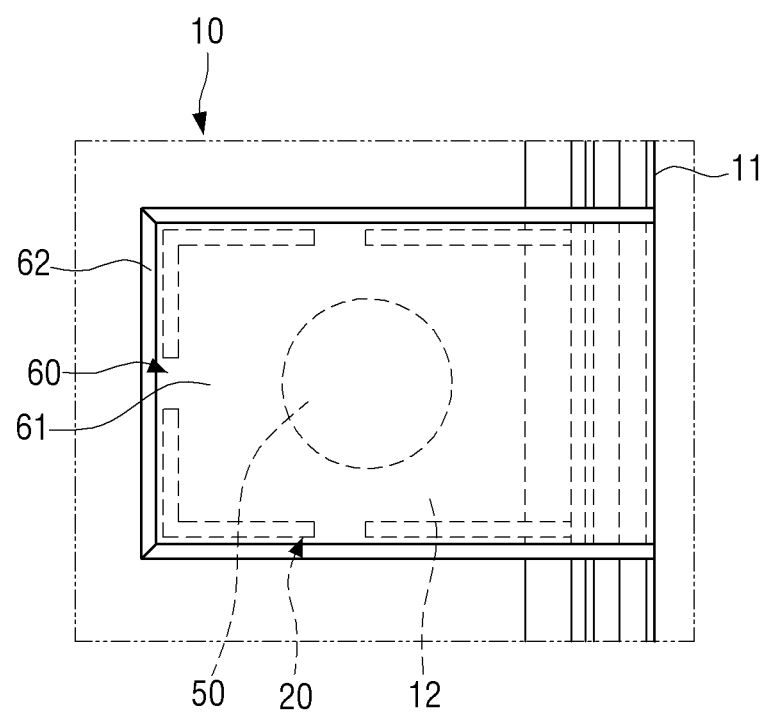
FIG. 9B is a partial rear view illustrating a guide duct of FIG. 9A.
Figure 10:
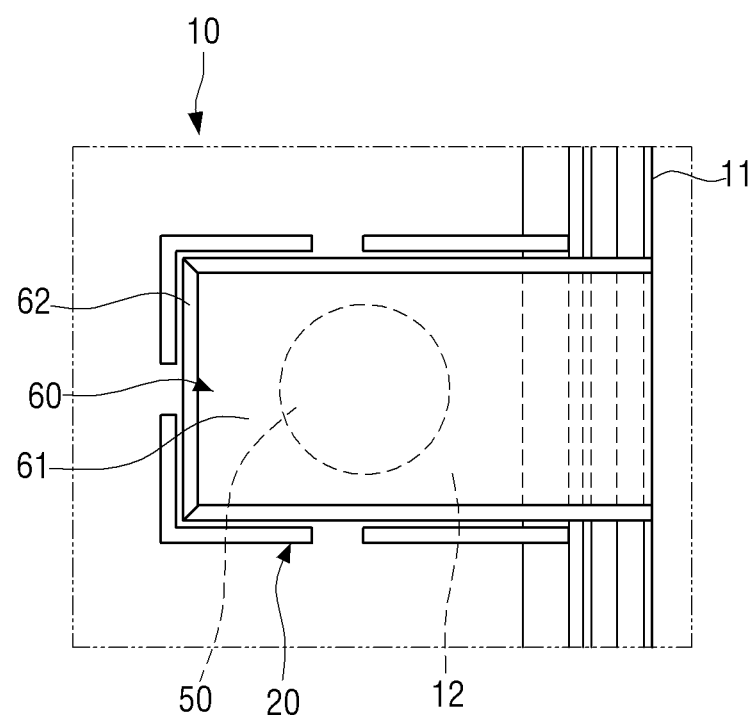
FIG. 10 is a partial rear view illustrating another example of a guide duct disposed in a vibration region of a rear chassis.

FIG. 9A is a partial cross-sectional view illustrating a display apparatus according to an embodiment, and FIG. 9B is a partial rear view illustrating a guide duct of FIG. 9A. FIG. 10 is a partial rear view illustrating another example of a guide duct disposed in a vibration region of a rear chassis.

Referring to FIGS. 9A and 9B, the guide duct 60 is disposed in the vibration region 12 of the rear chassis 10. The guide duct 60 is provided to surround the space S in contact with the vibration region 12 on one surface of the rear chassis 10 facing the rear housing 31, and is formed to guide sound generated in the vibration region 12 to the discharge port 33 of the rear housing 31. To this end, the guide duct 60 includes a top plate 61 which is disposed in parallel with a predetermined distance from the vibration region 12 and a side wall 62 extending from the top plate 61 and fixed to the rear chassis 10. The side wall 62 is provided with an opening communicating with the discharge port 33 of the rear housing 31.

The guide duct 60 is formed in a shape corresponding to the shape of the vibration region 12. In the case of this embodiment, because the vibration region 12 is formed in a substantially rectangular shape, the guide duct 60 includes the top plate 61 having a substantially rectangular shape and the side walls 62 extending toward the rear chassis 10 from the three sides of the top plate 61. One side of the top plate 61 without the side wall 62 communicates with the discharge port 33 of the rear housing 31. In this case, the side wall 62 of the guide duct 60 is fixed to the rear chassis 10 outside the vibration blocking part 20 provided around the vibration region 12. Therefore, the sound generated in the vibration region 12 by the vibrator 50 is guided to the discharge port 33 of the rear housing 31 by the guide duct 60, and then discharged to the outside.

In the case that the guide duct 60 is disposed outside the vibration blocking part 20 as illustrated in FIG. 9B, when the vibration region 12 vibrates, the guide duct 60 does not vibrate. However, as another example, as illustrated in FIG. 10, the guide duct 60 may be provided to vibrate together with the vibration region 12.

Referring to FIG. 10, the side wall 62 of the guide duct 60 is fixed to the vibration region 12 inside the vibration blocking part 20. Therefore, when the vibration region 12 vibrates, the guide duct 60 also vibrates, and guides the sound generated by the vibration region 12 to the discharge port 33 of the rear housing 31.

In the case of the display apparatus 1 as illustrated in FIG. 9A, the guide duct 60 is disposed on one surface of the rear chassis 10 facing the rear housing 31. Alternatively, the guide duct 60 may be disposed on the opposite surface of the rear chassis 10 as illustrated in FIG. 11.

Figure 11:
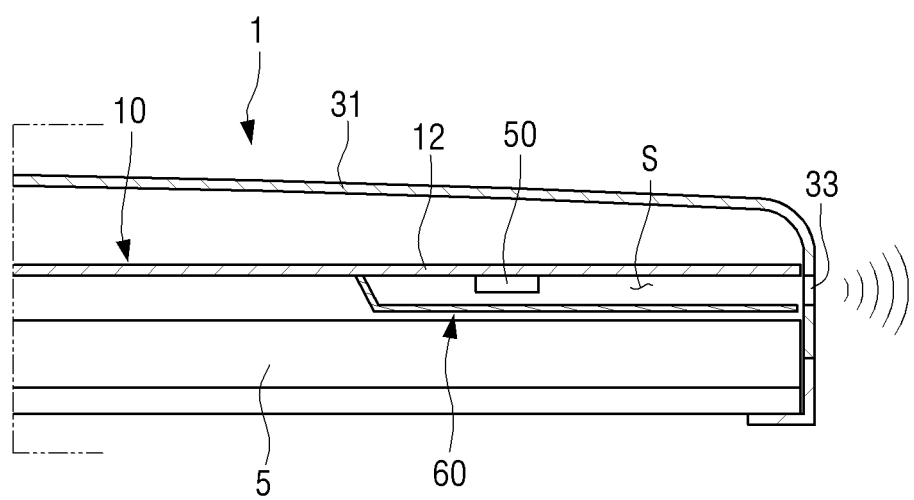
FIG. 11 is a partial cross-sectional view illustrating a display apparatus according to an embodiment.

FIG. 11 is a partial cross-sectional view illustrating a display apparatus according to an embodiment.

Referring to FIG. 11, the guide duct 60 is disposed on one surface of the rear chassis 10 facing the backlight assembly 5. In other words, the guide duct 60 is disposed between the rear surface of the backlight assembly 5 and the rear chassis 10 to guide the sound generated in the vibration region 12 to the discharge port 33 of the rear housing 31. The structure of the guide duct 60 is the same as the guide duct 60 according to the above-described embodiment; therefore, a detailed description thereof is omitted.

In the display apparatus 1 as illustrated in FIG. 2, the vibrator 50 is disposed on one surface of the vibration region 12 where the waveguide 40 is not provided, that is, one surface of the vibration region 12 facing the rear housing 31. However, the installation position of the vibrator 50 is not limited thereto. The vibrator 50 may be disposed on one surface of the vibration region 12 where the waveguide 40 is provided as illustrated in FIG. 12.

Figure 12:
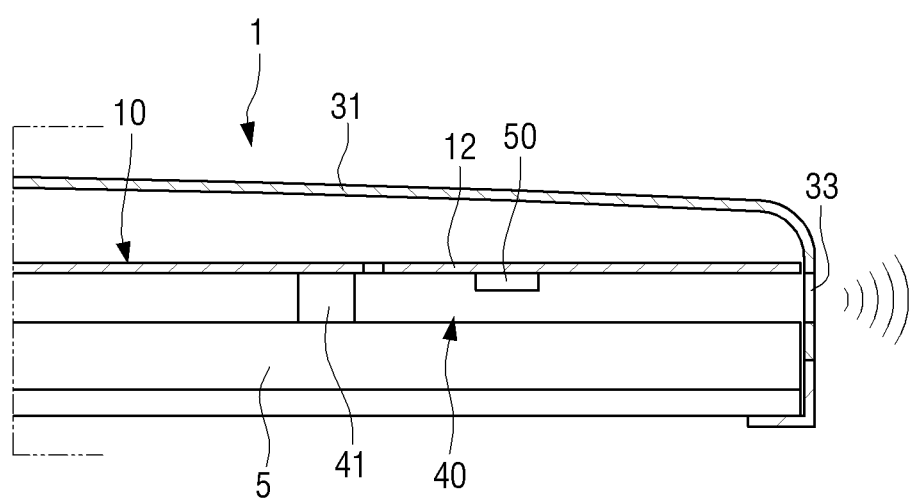
FIG. 12 is a partial cross-sectional view illustrating a display apparatus according to an embodiment.

FIG. 12 is a partial cross-sectional view illustrating a display apparatus according to an embodiment.

Referring to FIG. 12, the vibrator 50 is disposed on one surface of the vibration region 12 facing the rear surface of the backlight assembly 5. A sound absorbing member 41 is disposed around the vibration region 12 provided in the rear chassis 10. The vibrator 50 is positioned in the inside of the waveguide 40 formed by the sound absorbing member 41 and the rear surface of the backlight assembly 5.

Therefore, the sound generated in the vibration region 12 by the vibrator 50 is discharged to the outside of the rear housing 31 through the waveguide 40 formed by the sound absorbing member 41 and the rear surface of the backlight assembly 5. The rear housing 31 is provided with a discharge port 33 communicating with the waveguide 40.

The display apparatus 1 as illustrated in FIG. 12 is the same as or similar to the above-described display apparatus 1 as illustrated in FIG. 2 except for the position of the vibrator 50 disposed in the vibration region 12, and thus a detailed description thereof is omitted.

In FIGS. 2 and 3, the waveguide 40 including the sound absorbing member 41 is disposed on one surface of the rear chassis 10 facing the backlight assembly 5. However, the waveguide 40 may be disposed on one surface of the rear chassis 10 facing the rear housing 31 as illustrated in FIG. 13.

Figure 13:
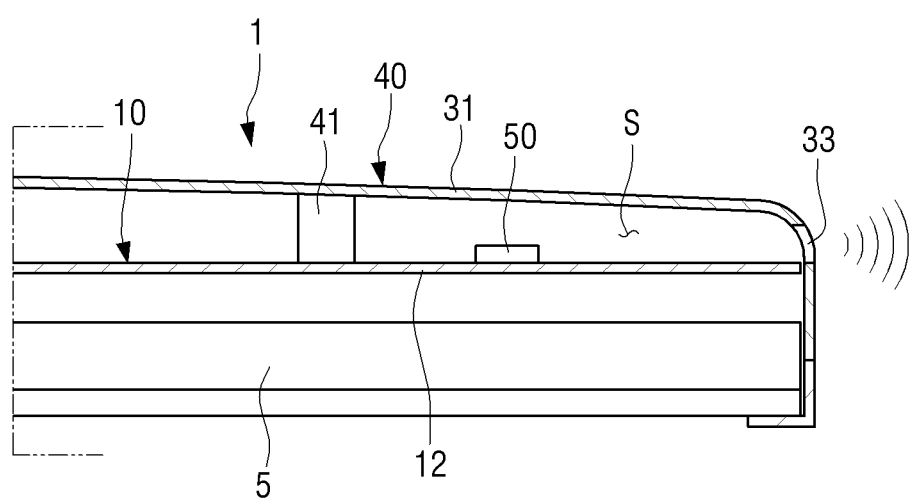
FIG. 13 is a partial cross-sectional view illustrating a display apparatus according to an embodiment.

FIG. 13 is a partial cross-sectional view illustrating a display apparatus according to an embodiment.

Referring to FIG. 13, the waveguide 40 is disposed on one surface of the rear chassis 10 facing the rear housing 31. In detail, the waveguide 40 includes the rear housing 31 and a sound absorbing member 41 provided to close the space S between the rear chassis 10 and the rear housing 31 along the periphery of the vibration region 12.

Therefore, the sound absorbing member 41 is provided along the periphery of the vibration region 12 on one surface of the rear chassis 10 facing the rear housing 31. The sound absorbing member 41 is formed in a flattened U-shape so as to surround the three sides of the vibration region 12, and one open side surface thereof is communicated with the discharge port 33 of the rear housing 31. The vibrator 50 is disposed on one surface of the vibration region 12 facing the rear housing 31. Therefore, the vibrator 50 is positioned inside the waveguide 40.

When sound is generated in the vibration region 12 by the vibrator 50, the sound is guided to the discharge port 33 of the rear housing 31 by the sound absorbing member 41 and the inner surface of the rear housing 31, and then is discharged to the outside.

The display apparatus 1 as illustrated in FIG. 13 is the same as or similar to the above-described display apparatus 1 as illustrated in FIG. 2 except for the position of the sound absorbing member 41 disposed around the vibration region 12, and thus a detailed description thereof is omitted.

In the display apparatus 1 as illustrated in FIG. 13, the vibrator 50 is disposed on one surface of the vibration region 12 where the waveguide 40 is provided, that is, one surface of the vibration region 12 facing the rear housing 31. However, the installation position of the vibrator 50 is not limited thereto. The vibrator 50 may be disposed on one surface of the vibration region 12 where the waveguide 40 is not provided, as illustrated in FIG. 14.

Figure 14:
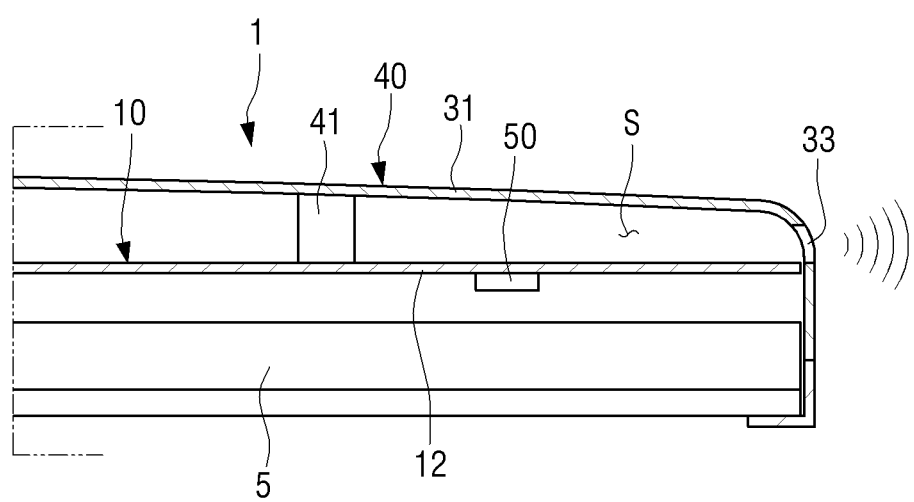
FIG. 14 is a partial cross-sectional view illustrating a display apparatus according to an embodiment.

FIG. 14 is a partial cross-sectional view illustrating a display apparatus according to an embodiment.

Referring to FIG. 14, the vibrator 50 is disposed on one surface of the vibration region 12 facing the rear surface of the backlight assembly 5. A sound absorbing member 41 is disposed around the vibration region 12 provided in the rear chassis 10. The vibrator 50 is positioned in the outside of the waveguide 40 formed by the sound absorbing member 41 and the inner surface of the rear housing 31.

Therefore, the sound generated in the vibration region 12 by the vibrator 50 is guided to the discharge port 33 of the rear housing 31 through the waveguide 40 formed by the sound absorbing member 41 and the inner surface of the rear housing 31, and then is discharged to the outside.

The display apparatus 1 as illustrated in FIG. 14 is the same as or similar to the above-described display apparatus 1 as illustrated in FIG. 13 except for the position of the vibrator 50 disposed in the vibration region 12, and thus a detailed description thereof is omitted.

In the embodiments of the display apparatus 1 as described above, one vibrator 50 is disposed in the vibration region 12. However, the number of the vibrators 50 of the display apparatus 1 according to the disclosure is not limited thereto. As another example, as illustrated in FIG. 15, two or more vibrators 50 may be disposed in the vibration region 12.

Figure 15:
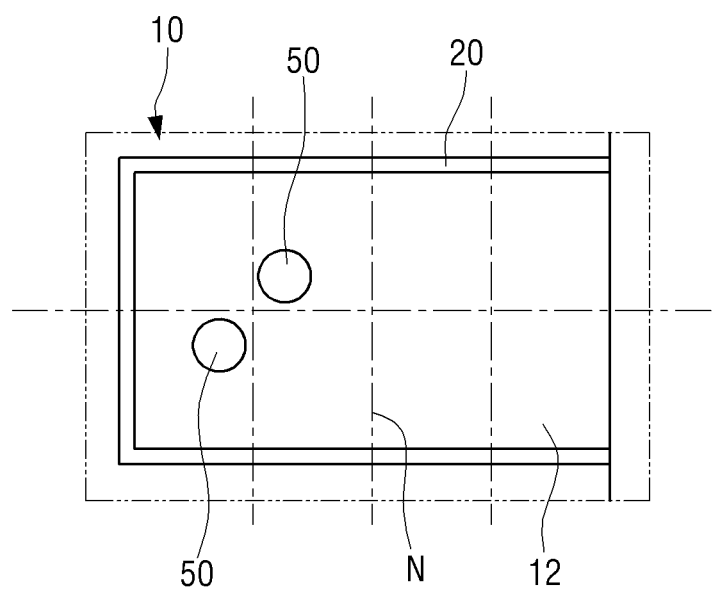
FIG. 15 is a partial view illustrating a case where two vibrators are disposed in a vibration region of a rear chassis of a display apparatus according to an embodiment.

FIG. 15 is a partial view illustrating a case where two vibrators are disposed in a vibration region of a rear chassis of a display apparatus according to an embodiment.

Referring to FIG. 15, two vibrators 50 are disposed in the vibration region 12 of the rear chassis 10. In this case, the two vibrators 50 are disposed to avoid the low frequency nodal lines N. In addition, the two vibrators 50 may be disposed to be adjacent to each other. When the plurality of vibrators 50 are disposed in the vibration region 12 as described above, the sound pressure of the sound formed by the vibration region 12 may be increased, and control of the vibration field may be improved.

In the above-described display apparatus 1, one vibration region 12 that makes the same vibration is formed in the rear chassis 10. However, two vibration regions 12 may be formed in the rear chassis 10 as illustrated in FIG. 3 to realize stereo. However, even in this case, the left vibration region 12 and the right vibration region 12 are formed to vibrate in the same sound range.

As another example, a plurality of vibration regions having different reproducing sound ranges may be formed in the rear chassis 10. In other words, as illustrated in FIG. 16, two vibration regions 12, that is, a first vibration region 12-1 and a second vibration region 12-2 may be formed in the rear chassis 10.

Figure 16:
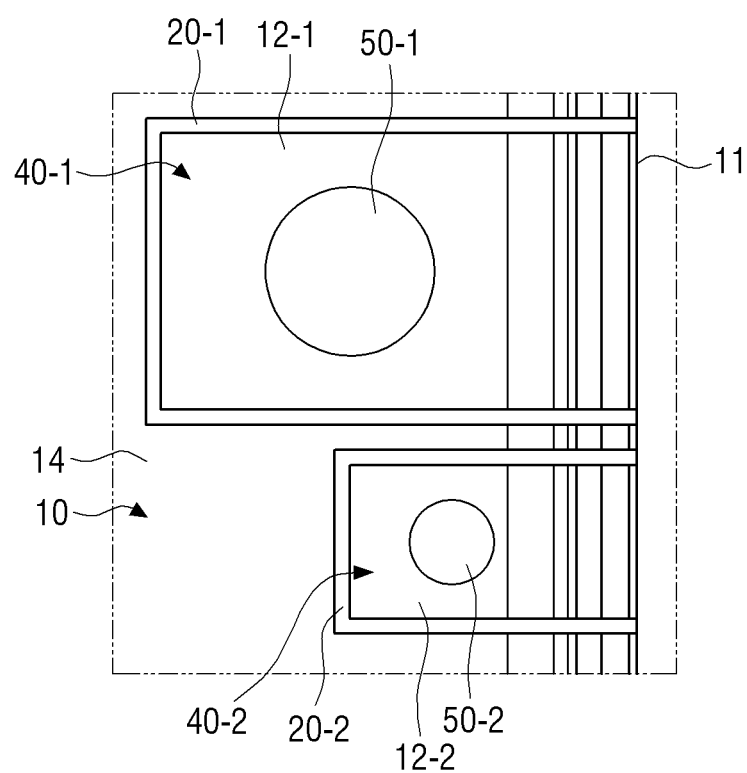
FIG. 16 is a partial view illustrating a case where two vibration regions are provided in a rear chassis of a display apparatus according to an embodiment.

FIG. 16 is a partial view illustrating a case where two vibration regions are provided in a rear chassis of a display apparatus according to an embodiment.

Referring to FIG. 16, a first vibrator 50-1 is disposed in the first vibration region 12-1 of the rear chassis 10, and a second vibrator 50-2 is disposed in the second vibration region 12-2.

The first vibration region 12-1 and the second vibration region 12-2 are formed to vibrate in different sound ranges. For example, the first vibration region 12-1 may be formed to operate as a mid-range speaker generating a mid-range sound between 300 and 2900 Hz, and the second vibration region 12-2 may be formed to operate as a tweeter speaker generating a high-range sound of 3000 Hz or higher.

Three sides of the first vibration region 12-1 are surrounded by a first vibration blocking part 20-1, so that vibration generated by the first vibration region 12-1 is blocked from being transmitted to the second vibration region 12-2 and the remaining part 14 of the rear chassis 10. Also, three sides of the second vibration region 12-2 are surrounded by a second vibration blocking part 20-2, so that vibration generated by the second vibration region 12-2 is blocked from being transmitted to the first vibration region 12-1 and the remaining part 14 of the rear chassis 10.

Because a first waveguide 40-1 and a second waveguide 40-2 are provided in the first vibration region 12-1 and the second vibration region 12-2, respectively, and the first and second waveguides 40-1 and 40-2 are in communication with the discharge port 33 provided in the rear housing 31, the sound generated in the first and second vibration regions 12-1 and 12-2 is guided to the discharge port 33 of the rear housing 31 through the first and second waveguides 40-1 and 40-2, and then is discharged to the outside through the discharge port 33.

In the above description, the vibration region 12 formed in the rear chassis 10 has a substantially rectangular shape. However, the shape of the vibration region 12 is not limited thereto. The vibration region 12 may be formed in various shapes as long as they can vibrate by the vibrator 50 to generate sound.

Figure 17A:
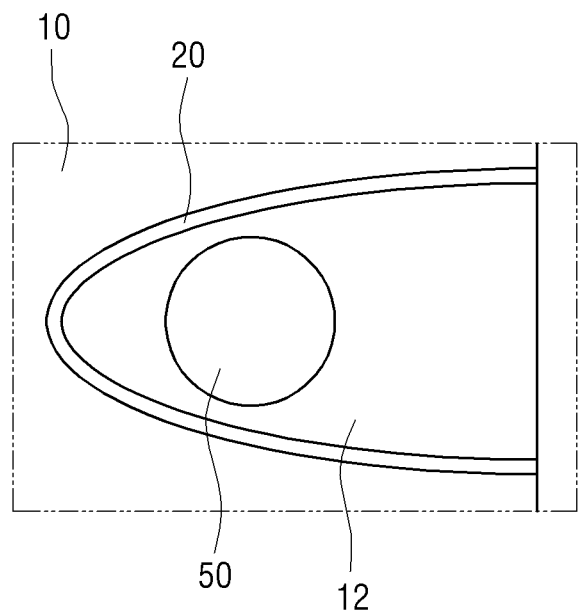
FIGS. 17A, 17B, and 17C are views illustrating various shapes of a vibration region formed in a rear chassis of a display apparatus according to an embodiment.
Figure 17B:
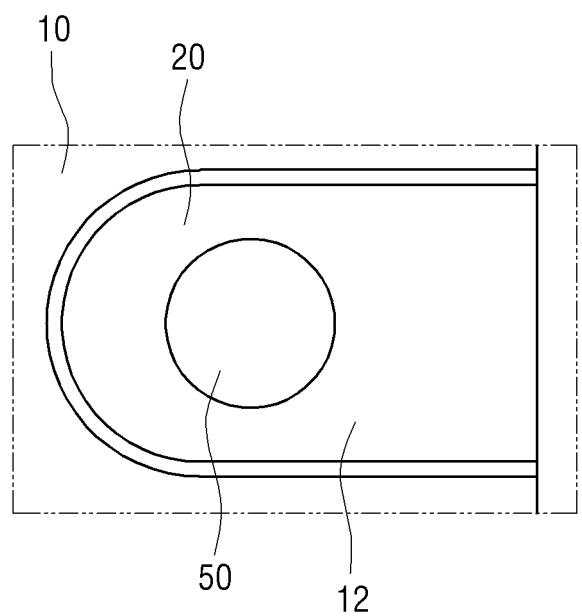
Figure 17C:
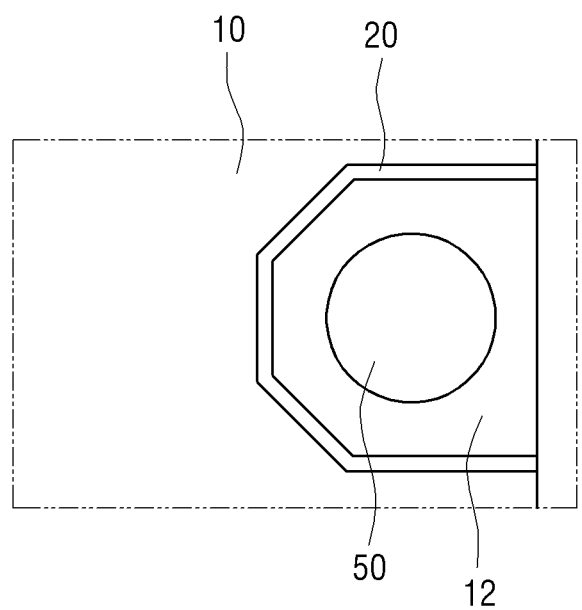

FIGS. 17A, 17B, and 17C are views illustrating various shapes of a vibration region formed in a rear chassis of a display apparatus according to an embodiment.

For example, the vibration region 12 may be formed in an approximately semi-elliptical shape as illustrated in FIG. 17A. In this case, the vibration blocking part 20 provided around the vibration region 12 is formed in an approximately semi-elliptical shape. The vibrator 50 is disposed in the vibration region 12.

As another example, the vibration region 12 may be formed in an approximately half track shape as illustrated in FIG. 17B. In this case, the vibration blocking part 20 provided around the vibration region 12 is formed in an approximately half track shape.

As another example, the vibration region 12 may be formed in an approximately half-octagonal shape as illustrated in FIG. 17C. In this case, the vibration blocking part 20 provided around the vibration region 12 is formed in an approximately half-octagonal shape.

In addition, in the above-described display apparatus 1, two discharge ports 33 through which sound is emitted are formed in both side surfaces of the housing 30. However, the position of the two discharge ports 33 is not limited thereto. The two discharge ports 33 may be formed in the top surface of the housing 30 or the bottom surface of the housing 30.

Figure 18:
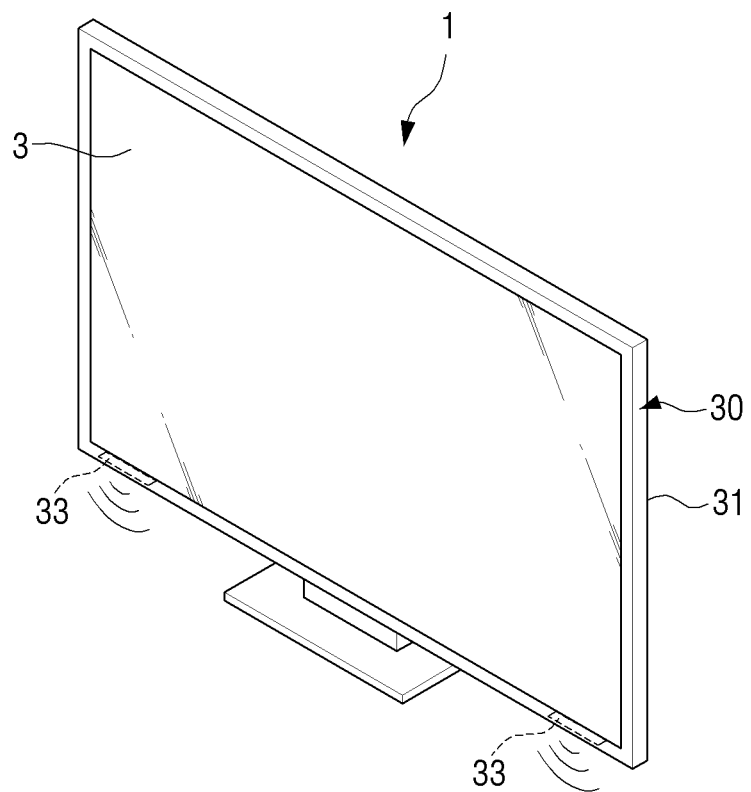
FIG. 18 is a perspective view illustrating a display apparatus according to an embodiment.
Figure 19:
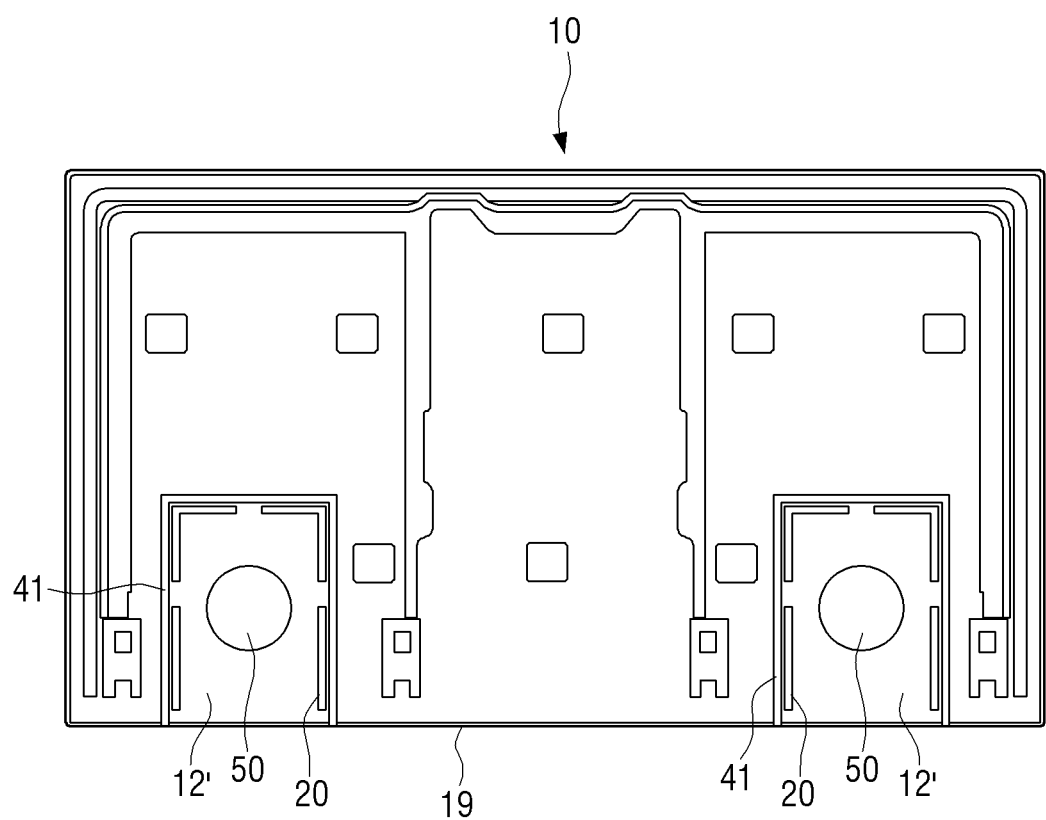
FIG. 19 is a view illustrating a rear chassis of the display apparatus of FIG. 18.

FIG. 18 is a perspective view illustrating a display apparatus according to an embodiment in which two discharge ports are formed in a bottom surface of a housing. FIG. 19 is a view illustrating a rear chassis of the display apparatus of FIG. 18.

Referring to FIG. 18, two discharge ports 33 that emit sound generated in vibration region 12' are formed in the bottom surface of the housing 30, in detail, the rear housing 31.

As illustrated in FIG. 19, the two vibration regions 12' are provided in the rear chassis 10 disposed inside the rear housing 31. In this case, the two vibration regions 12' are provided to be adjacent to the lower end 19 of the rear chassis 10. Accordingly, each of the two vibration regions 12' is vibratingly isolated from the remaining part 14 of the rear chassis 10 by the vibration blocking part 20. Therefore, the vibration generated by the vibration regions 12' are not transmitted to the remaining part 14 of the rear chassis 10.

In addition, each of the two vibration regions 12' is surrounded in the approximately flattened U-shape by a sound absorbing member 41, and the sound absorbing member 41 is not provided at the lower end of the vibration region 12'. Therefore, the lower end of the vibration region 12' where the sound absorbing member 41 is not disposed is in communication with the discharge port 33 provided in the rear housing 31. Accordingly, the sound generated in the vibration region 12' is guided to the discharge port 33 by the waveguide 40 formed of the sound absorbing member 41, and is discharged to the outside of the display apparatus 1.

In the above description, a part of the rear chassis 10 is formed as the vibration region 12 which is vibrated by the vibrator 50. However, as another example, the rear chassis 10 may be used as a waveguide, and a vibration plate formed separately from the rear chassis 10 may generate sound.

Hereinafter, a display apparatus for generating sound using a vibration plate will be described in detail with reference to FIGS. 20 to 22.

Figure 20:
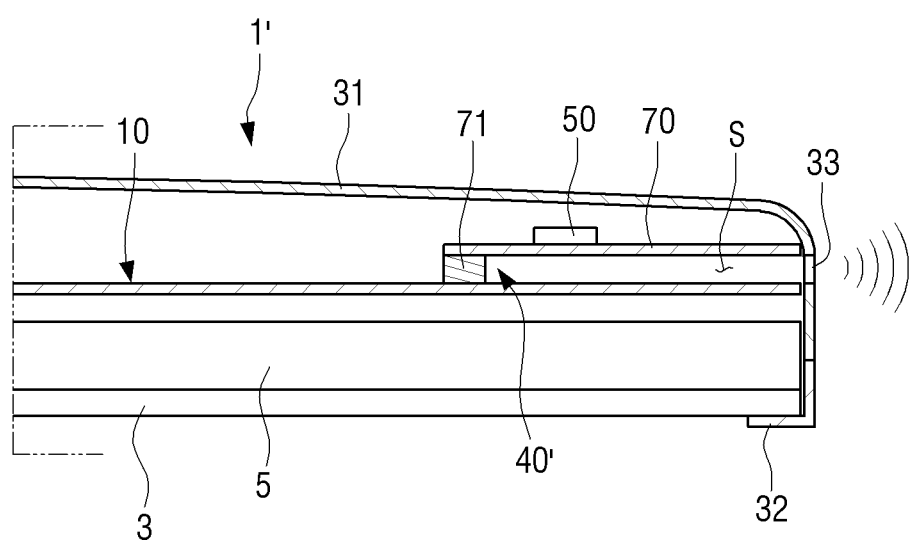
FIG. 20 is a partial cross-sectional view illustrating a display apparatus according to an embodiment.

FIG. 20 is a partial cross-sectional view illustrating a display apparatus according to an embodiment. FIG. 21 is a partial rear view illustrating a state in which a rear housing is removed from the display apparatus of FIG. 20. FIG. 22 is a partial cross-sectional view illustrating a display apparatus according to an embodiment.

Figure 21:
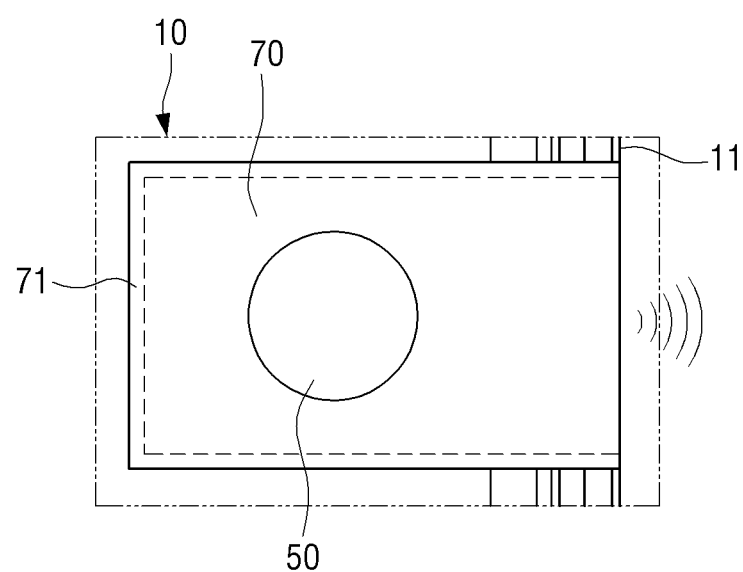
FIG. 21 is a partial rear view illustrating a state in which a rear housing is removed from the display apparatus of FIG. 20.

Referring to FIGS. 20 and 21, a display apparatus 1' according to an embodiment may include a liquid crystal display panel 3, a backlight assembly 5, a rear chassis 10, a rear housing 31, and a front housing 32.

The liquid crystal display panel 3, the backlight assembly 5, the front housing 32, and the rear housing 31 are the same as or similar to the liquid crystal display panel 3, the backlight assembly 5, the front housing 32, and the rear housing 31 of the display apparatus 1 as illustrated in FIG. 2; therefore, detailed descriptions thereof are omitted.

A vibration plate 70 is disposed to be spaced apart by a predetermined distance from one surface of the rear chassis 10, that is, one surface of the rear chassis 10 facing the rear housing 31. In other words, the vibration plate 70 is disposed in the space S between the rear chassis 10 and the rear housing 31. In addition, the vibration plate 70 is disposed adjacent to the edge 11 of the rear chassis 10. For example, in the case of the display apparatus 1' according to an embodiment as illustrated in FIG. 20, the vibration plate 70 is disposed adjacent to one side surface of the rear chassis 10.

The vibration plate 70 is supported by a support member 71 to be spaced apart from the rear chassis 10 by a predetermined distance. The support member 71 is provided along the edge of the vibration plate 70 as illustrated in FIG. 21. In this case, one side of the vibration plate 70 may be disposed so as not to be supported by the support member 71. The portion of the vibration plate 70 where the support member 71 is not disposed forms an opening through which sound generated by the vibration plate 70 is emitted. The opening is in communication with the discharge port 33 of the rear housing 31.

The support member 71 may be formed of a damping member so that vibration of the vibration plate 70 is not transmitted to the rear chassis 10. The damping member may include a rubber-like material capable of absorbing vibration of the vibration plate 70.

The vibrator 50 is disposed on one surface of the vibration plate 70. In the embodiment as illustrated in FIG. 20, the vibrator 50 is disposed on one surface of the vibration plate 70 facing the rear housing 31.

Figure 22:
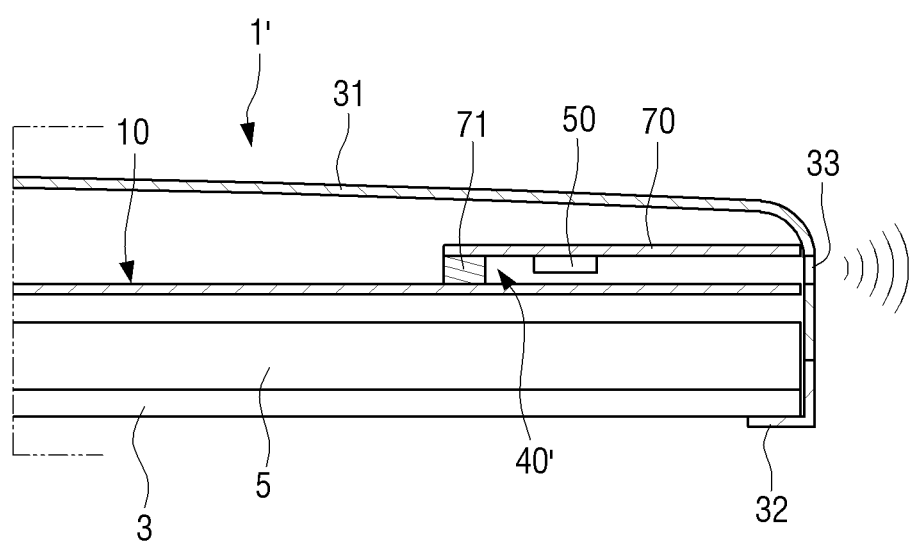
FIG. 22 is a partial cross-sectional view illustrating a display apparatus according to an embodiment.

As another example, the vibrator 50 may be disposed on the opposite surface of the vibration plate 70 as illustrated in FIG. 22. In other words, the vibrator 50 may be disposed on one surface of the vibration plate 70 facing the rear chassis 10. In this case, the vibrator 50 is positioned inside the waveguide 40'.

The rear housing 31 surrounds the rear chassis 10 and includes the discharge port 33 that is in communication with the space S in contact with the vibration plate 70 of the rear chassis 10, that is, the space S between the rear chassis 10 and the vibration plate 70 and discharges the sound generated by the vibration plate 70 to the outside.

The waveguide 40' is formed to guide the sound generated by the vibration plate 70 to the discharge port 33 of the rear housing 31, and may be provided between the backlight assembly 5 and the rear housing 31.

For example, the waveguide 40' may be formed of the support member 71 supporting the vibration plate 70 and the rear chassis 10. The support member 71 is provided to block the space S between the rear chassis 10 and the vibration plate 70 along the periphery of the vibration plate 70. Therefore, the sound generated by the vibration plate 70 is guided to the discharge port 33 of the rear housing 31 by the waveguide 40' and is discharged to the outside of the display apparatus 1'.

In the embodiment as illustrated in FIGS. 20 and 21, the vibration plate 70 is disposed in the rear chassis 10. However, alternatively, the vibration plate 70 may be disposed in the rear housing 31. Hereinafter, a case where the vibration plate 70 is disposed in the rear housing 31 will be described with reference to FIGS. 23 and 24.

Figure 23:
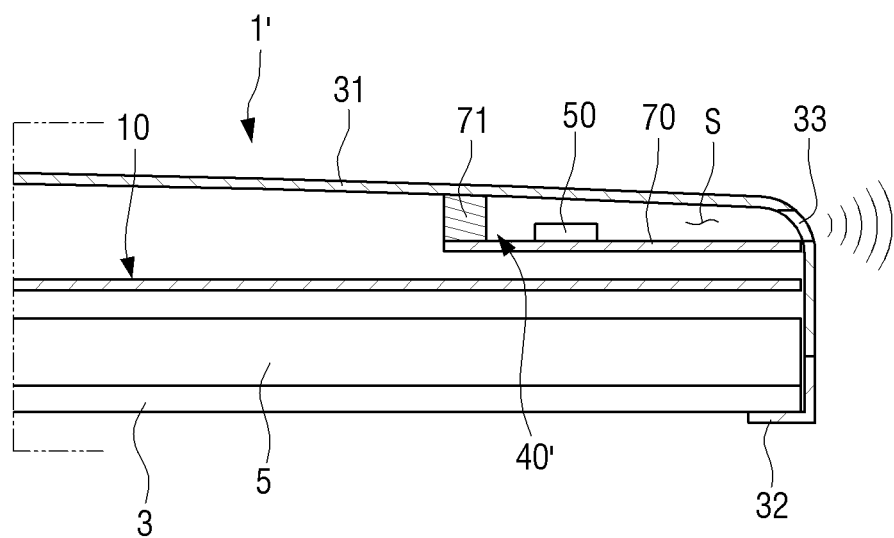
FIG. 23 is a partial cross-sectional view illustrating a display apparatus according to an embodiment.
Figure 24:
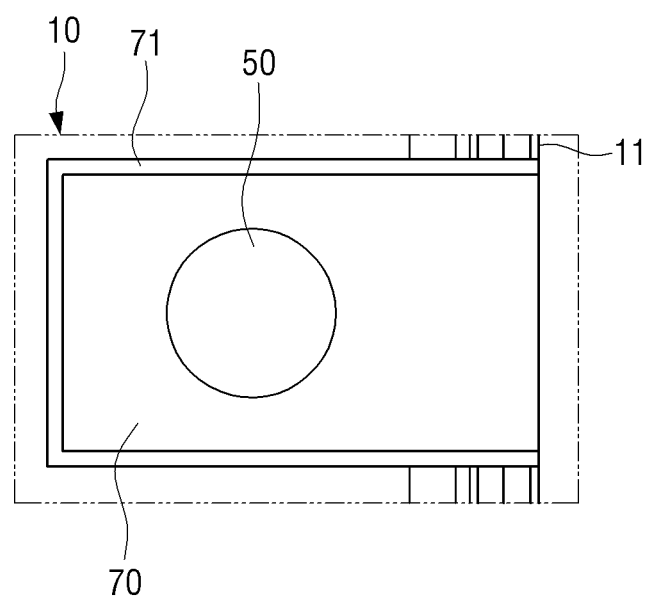
FIG. 24 is a partial rear view illustrating a state in which a rear housing is removed from the display apparatus of FIG. 23.

FIG. 23 is a partial cross-sectional view illustrating a display apparatus according to an embodiment, and FIG. 24 is a partial rear view illustrating a state in which a rear housing is removed from the display apparatus of FIG. 23.

Referring to FIGS. 23 and 24, a display apparatus 1' according to an embodiment may include a liquid crystal display panel 3, a backlight assembly 5, a rear chassis 10, a front housing 32, and a rear housing 31.

The liquid crystal display panel 3, the backlight assembly 5, the front housing 32, and the rear housing 31 are the same as or similar to the liquid crystal display panel 3, the backlight assembly 5, the front housing 32, and the rear housing 31 of the display apparatus 1' as illustrated in FIG. 20; therefore, detailed descriptions thereof are omitted.

A vibration plate 70 is formed to be vibrated by the vibrator 50 to generate sound. The vibration plate 70 is disposed to be spaced apart by a predetermined distance from one surface of the rear housing 31, that is, the inner surface of the rear housing 31 facing the rear chassis 10. In other words, the vibration plate 70 is disposed in the space S between the rear chassis 10 and the rear housing 31.

In addition, the vibration plate 70 is disposed adjacent to the edge of the rear housing 31. For example, in the case of the embodiment as illustrated in FIG. 23, the vibration plate 70 is disposed adjacent to one side surface of the rear housing 31.

The vibration plate 70 is supported by a support member 71 to be spaced apart from the rear housing 31 by a predetermined distance. In this case, the vibration plate 70 is also disposed to be spaced apart from the rear chassis 10 by a predetermined distance.

The support member 71 is provided along the edge of the vibration plate 70 as illustrated in FIG. 24. In this case, one side of the vibration plate 70 may be disposed so as not to be supported by the support member 71. The portion of the vibration plate 70 where the support member 71 is not disposed forms an opening through which the sound generated by the vibration plate 70 is emitted. The opening is in communication with the discharge port 33 of the rear housing 31.

The support member 71 may be formed of a damping member so that vibration of the vibration plate 70 is not transmitted to the rear housing 31. The damping member may include a rubber-like material capable of absorbing vibration of the vibration plate 70.

The vibrator 50 is disposed on one surface of the vibration plate 70. In the embodiment as illustrated in FIG. 23, the vibrator 50 is disposed on one surface of the vibration plate 70 facing the rear housing 31. Therefore, the vibrator 50 is positioned inside the waveguide 40'.

As another example, although not illustrated, the vibrator 50 may be disposed on the opposite surface of the vibration plate 70. In other words, the vibrator 50 may be disposed on one surface of the vibration plate 70 facing the rear chassis 10.

The rear housing 31 surrounds the rear chassis 10 and includes the discharge port 33 that is in communication with the space S between the rear housing 31 and the vibration plate 70 and discharges the sound generated by the vibration plate 70 to the outside.

The waveguide 40' is formed to guide the sound generated by the vibration plate 70 to the discharge port 33 of the rear housing 31. For example, the waveguide 40' may be formed of the support member 71 supporting the vibration plate 70 and the rear housing 31. The support member 71 is provided to block the space S between the rear housing 31 and the vibration plate 70 along the periphery of the vibration plate 70. Therefore, the sound generated by the vibration plate 70 is guided to the discharge port 33 of the rear housing 31 by the waveguide 40' and is discharged to the outside of the display apparatus 1'.

In the embodiments as illustrated in FIGS. 20 to 24, the vibration plate 70 is disposed between the rear chassis 10 and the rear housing 31. However, alternatively, the vibration plate 70 may be disposed between the rear chassis 10 and the backlight assembly 5. Hereinafter, a case where the vibration plate 70 is disposed between the rear chassis 10 and the backlight assembly 5 will be described with reference to FIGS. 25 and 26.

Figure 25:
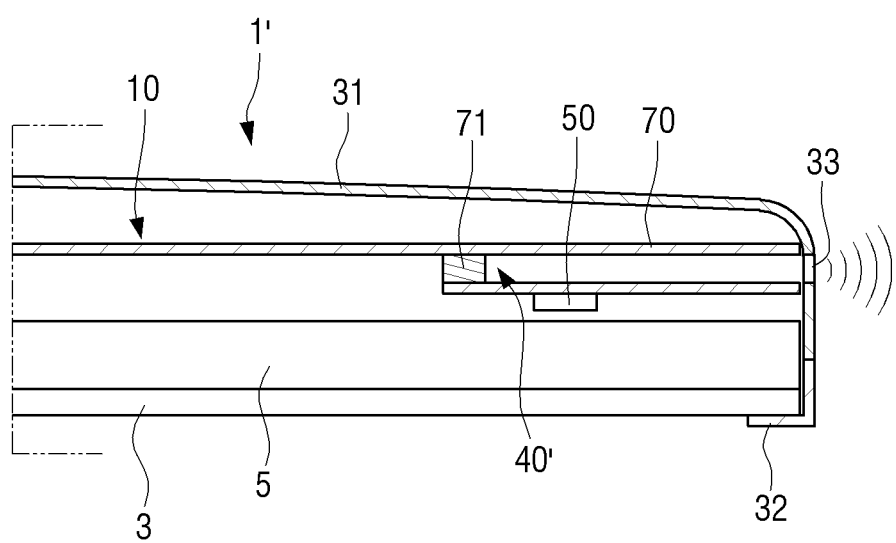
FIG. 25 is a partial cross-sectional view illustrating a display apparatus according to an embodiment.
Figure 26:
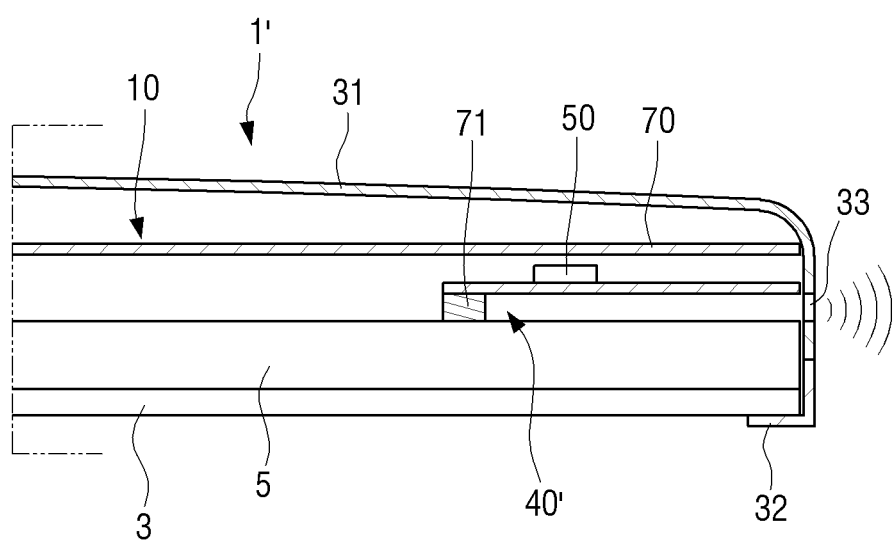
FIG. 26 is a partial cross-sectional view illustrating a display apparatus according to an embodiment.

FIG. 25 is a partial cross-sectional view illustrating a display apparatus according to an embodiment. FIG. 26 is a partial cross-sectional view illustrating a display apparatus according to an embodiment.

Referring to FIG. 25, the vibration plate 70 is disposed on the lower surface of the rear chassis 10. In other words, the vibration plate 70 is disposed in the space between the rear chassis 10 and the backlight assembly 5.

The vibration plate 70 is supported by a support member 71 provided on the lower surface of the rear chassis 10, and is spaced apart from the rear chassis 10 by a predetermined distance. In this case, the vibration plate 70 is also disposed to be spaced apart from the backlight assembly 5 by a predetermined distance.

The support member 71 is provided along the edge of the vibration plate 70 (see FIG. 24). In this case, one side of the vibration plate 70 may be disposed so as not to be supported by the support member 71. The portion of the vibration plate 70 where the support member 71 is not disposed forms an opening through which the sound generated by the vibration plate 70 is emitted. The opening is in communication with the discharge port 33 of the rear housing 31.

The support member 71 may be formed of a damping member so that vibration of the vibration plate 70 is not transmitted to the rear chassis 10. The damping member may include a rubber-like material capable of absorbing vibration of the vibration plate 70.

The vibrator 50 is disposed on one surface of the vibration plate 70. In the embodiment as illustrated in FIG. 25, the vibrator 50 is disposed on one surface of the vibration plate 70 facing the backlight assembly 5.

As another example, although not illustrated, the vibrator 50 may be disposed on the opposite surface of the vibration plate 70. In other words, the vibrator 50 may be disposed on one surface of the vibration plate 70 facing the rear chassis 10. In this case, the vibrator 50 is positioned inside the waveguide 40'.

In FIG. 25, the support member 71 supporting the vibration plate 70 and the rear chassis 10 forms a waveguide 40'. Therefore, the sound generated by the vibration plate 70 is guided to the discharge port 33 of the rear housing 31 by the waveguide 40', and then is discharged to the outside of the display apparatus 1'.

Referring to FIG. 26, the vibration plate 70 is disposed on the rear surface of the backlight assembly 5. In other words, the vibration plate 70 is disposed in the space between the rear chassis 10 and the backlight assembly 5.

The vibration plate 70 is supported by a support member 71 provided on the rear surface of the backlight assembly 5, and is spaced apart from the rear surface of the backlight assembly 5 by a predetermined distance. In this case, the vibration plate 70 is also disposed to be spaced apart from the rear chassis 10 by a predetermined distance.

The support member 71 is provided along the edge of the vibration plate 70 (see FIG. 24). In this case, one side of the vibration plate 70 may be disposed so as not to be supported by the support member 71. The portion of the vibration plate 70 where the support member 71 is not disposed forms an opening through which the sound generated by the vibration plate 70 is emitted. The opening is in communication with the discharge port 33 of the rear housing 31.

The support member 71 may be formed of a damping member so that vibration of the vibration plate 70 is not transmitted to the backlight assembly 5.

The vibrator 50 is disposed on one surface of the vibration plate 70. In the embodiment as illustrated in FIG. 26, the vibrator 50 is disposed on one surface of the vibration plate 70 facing the rear chassis 10.

As another example, although not illustrated, the vibrator 50 may be disposed on the opposite surface of the vibration plate 70. In other words, the vibrator 50 may be disposed on one surface of the vibration plate 70 facing the backlight assembly 5. In this case, the vibrator 50 is positioned inside the waveguide 40'.

In FIG. 26, the support member 71 supporting the vibration plate 70 and the backlight assembly 5 forms a waveguide 40'. Therefore, the sound generated by the vibration plate 70 is guided to the discharge port 33 of the rear housing 31 by the waveguide 40' and is discharged to the outside of the display apparatus 1'.

Hereinafter, the effects of the display apparatus 1 according to an embodiment having the above-described structure and the display apparatus having a related art speaker will be described with reference to FIGS. 27 to 29.

Figure 27:
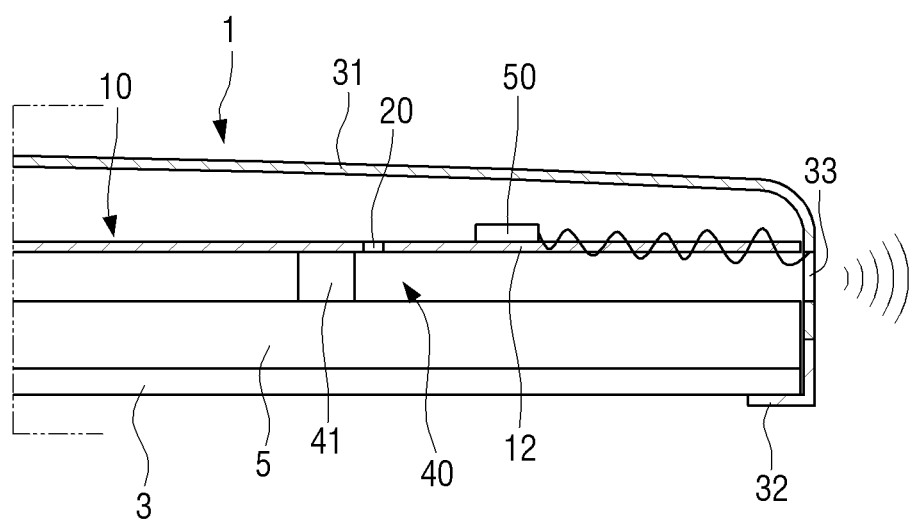
FIG. 27 is a view illustrating a state in which sound is emitted by a speaker of a display apparatus according to an embodiment.

FIG. 27 is a view conceptually illustrating a state in which sound is emitted by a speaker of a display apparatus according to an embodiment. FIG. 28 is a view conceptually illustrating a state in which sound is emitted from a display apparatus having a speaker according to the related art. FIG. 29 is a graph illustrating comparing sound pressure of a speaker of a display apparatus according to the related art and sound pressure of a speaker provided in a display apparatus according to an embodiment.

In the display apparatus 1 according to an embodiment, when the vibrator 50 is operated by a signal input from a controller, the vibration region 12 of the rear chassis 10 vibrates to generate sound. At this time, in the display apparatus 1 according to an embodiment, as illustrated in FIG. 27, the vibration region 12 surrounded by the vibration blocking part 20 vibrates as a whole to generate sound. In other words, the vibration region 12 having an area almost similar to the area of the waveguide 40 vibrates as a whole to generate sound, and the sound is discharged to the outside through the waveguide 40 and the discharge port 33 of the rear housing 31.

Figure 28:
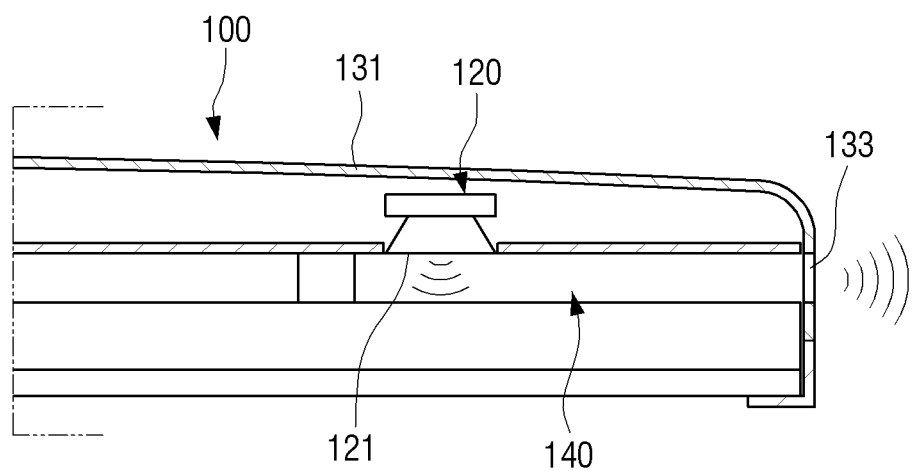
FIG. 28 is a view illustrating a state in which sound is emitted from a display apparatus having a speaker according to the related art.
Figure 29:
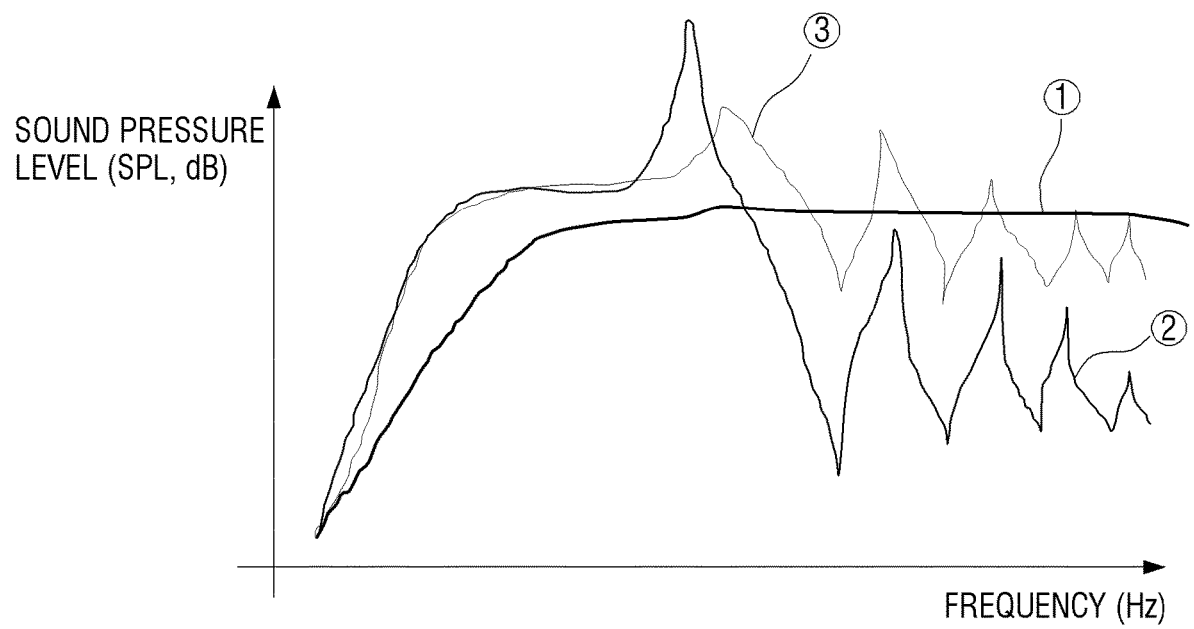
FIG. 29 is a graph illustrating comparing sound pressure of a speaker according to the related art and sound pressure of a speaker provided in a display apparatus according to an embodiment.

However, in the display apparatus 100 according to the related art, sound is generated by a vibration plate 121 of a speaker 120 that is disposed inside a waveguide 140 and has an area smaller than that of the waveguide 140 as illustrated in FIG. 28. The sound generated by the speaker 120 is guided to a discharge port 133 of a rear housing 131 by the waveguide 140 and discharged to the outside.

However, in the display apparatus 100 according to the related art, while the sound emitted from the speaker 120 passes through the waveguide 40 and is discharged through the discharge port 33, the energy of the sound is reduced. Therefore, as can be seen line ② of FIG. 29, in the high frequency region, the sound pressure is lowered, so that the sound pressure does not reach the target curve (line ①).

However, in the display apparatus 1 according to an embodiment, because the vibration region 12 having a size corresponding to the entire region of the waveguide 40 vibrates as a whole to generate sound, the energy reduction of the sound is smaller than that of the display apparatus 100 according to the related art while the sound is discharged to the outside through the waveguide 40 and the discharge port 33. Therefore, as can be seen line ③ of FIG. 29, the sound pressure of the sound emitted from the display apparatus 1 approaches the target curve (line ①) in the high frequency region.

With the display apparatus according to an embodiment having the above-described structure, the vibrator generates sound by vibrating the rear chassis which is the structure of the display apparatus. Therefore, the display apparatus according to an embodiment may have a smaller thickness than the display apparatus according to the related art configured to generate sound using a speaker formed separately from the structure of the display apparatus.

In addition, the display apparatus according to an embodiment having the above-described structure generates sound by vibrating a vibration region having an area similar to that of the entire region of the waveguide. Therefore, the display apparatus according to an embodiment may emit sound having a higher sound pressure than a display apparatus according to the related art in which a vibration plate of a speaker having an area smaller than that of a waveguide vibrates to generate sound.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising
 a rear chassis configured to support a liquid crystal display panel and a backlight assembly;
 a vibration region formed as a part of the rear chassis adjacent to an edge of the rear chassis, the vibration region being isolated from a remaining part of the rear chassis by a vibration blocking part so that vibration is not transmitted to the remaining part of the rear chassis;
 a vibrator disposed in the vibration region;
 a rear housing configured to surround the rear chassis and including a discharge port communicating with the vibration region of the rear chassis to discharge sound generated in the vibration region to an outside; and
 a waveguide disposed on the rear chassis and configured to guide the sound generated in the vibration region to the discharge port of the rear housing,
 wherein the vibration blocking part comprises:
  a slit which is formed in the rear chassis and surrounds the vibration region, to isolate the vibration region from the remaining part of the rear chassis, and
  a plurality of bridges provided in the slit and connecting the vibration region to the remaining part of the rear chassis.

2. The display apparatus as claimed in claim 1, wherein the vibrator comprises a plurality of vibrators disposed in the vibration region.

3. The display apparatus as claimed in claim 1, wherein the rear chassis comprises a reinforcing bead that protrudes from one surface of the rear chassis and reinforces a strength of the rear chassis, and
 wherein the vibrator is disposed on a surface where the reinforcing bead is protruded.

4. The display apparatus as claimed in claim 1, wherein the waveguide is provided on one surface of the rear chassis facing the rear housing.

5. The display apparatus as claimed in claim 4, wherein the waveguide is formed of a sound absorbing member provided to close a space between the rear chassis and the rear housing along a periphery of the vibration region.

6. The display apparatus as claimed in claim 1, wherein the waveguide is provided on one surface of the rear chassis facing the backlight assembly.

7. The display apparatus as claimed in claim 6, wherein the waveguide is formed of a sound absorbing member provided to close a space between the rear chassis and the backlight assembly along a periphery of the vibration region.

8. The display apparatus as claimed in claim 1, wherein the waveguide is formed as a guide duct provided on one surface of the rear chassis to surround a space facing the vibration region.

9. The display apparatus as claimed in claim 1, wherein the rear chassis comprises a step portion protruding toward the backlight assembly, and
 the vibration region is formed on a bottom surface of the step portion.

10. The display apparatus as claimed in claim 1, wherein
the rear chassis comprises a step portion protruding toward the rear housing, and
the vibration region is formed on a bottom surface of the step portion.

11. The display apparatus as claimed in claim 1, wherein
the vibration region comprises two vibration regions formed in the rear chassis so that the two vibration regions are line-symmetric with respect to a longitudinal center line of the rear chassis, and
wherein the vibrator comprises two vibrators provided in the two vibration regions.

12. The display apparatus as claimed in claim 11, wherein
the rear housing comprises two discharge ports corresponding to the two vibration regions, and
the two discharge ports are formed in a bottom surface of the rear housing.

13. The display apparatus as claimed in claim 11, wherein
the rear housing comprises two discharge ports corresponding to the two vibration regions, and
the two discharge ports are formed in both side surfaces of the rear housing.

14. The display apparatus as claimed in claim 1, wherein
the vibration region comprises a plurality of vibration regions having different reproducing sound ranges.

15. A display apparatus comprising:
a rear chassis configured to support a liquid crystal display panel and a backlight assembly;
a vibration plate provided to face a part of the rear chassis adjacent to an edge of the rear chassis and spaced apart from the part by a predetermined distance;
a vibrator disposed in the vibration plate;
a rear housing configured to surround the rear chassis and including a discharge port communicating with a space in contact with the vibration plate of the rear chassis to discharge sound generated by the vibration plate to an outside; and
a waveguide disposed between the backlight assembly and the rear housing and configured to guide the sound generated by the vibration plate to the discharge port of the rear housing,
wherein the waveguide extends adjacent the vibration plate, along a periphery of the vibration plate.

16. The display apparatus as claimed in claim 15, wherein
the vibration plate is disposed between the rear chassis and the rear housing.

17. The display apparatus as claimed in claim 16, wherein
the waveguide is formed of a support member provided to close a space between the rear chassis and the vibration plate along the periphery of the vibration plate.

18. The display apparatus as claimed in claim 15, wherein
the vibration plate is disposed between the rear chassis and the backlight assembly.

* * * * *